(12) United States Patent
Kim et al.

(10) Patent No.: US 11,057,965 B2
(45) Date of Patent: Jul. 6, 2021

(54) CONTROL DEVICE OF WATER PURIFIER, WATER PURIFIER, AND CONTROL METHOD THEREOF

(71) Applicant: LG ELECTRONICS INC., Seoul (KR)

(72) Inventors: Yonghyun Kim, Seoul (KR); Kobong Choi, Seoul (KR); Jewook Jeon, Seoul (KR); Siyeon An, Seoul (KR)

(73) Assignee: LG Electronics Inc., Seoul (KR)

( * ) Notice: Subject to any disclaimer, the term of this patent is extended or adjusted under 35 U.S.C. 154(b) by 507 days.

(21) Appl. No.: 15/586,335

(22) Filed: May 4, 2017

(65) Prior Publication Data

US 2017/0325294 A1 Nov. 9, 2017

(30) Foreign Application Priority Data

May 4, 2016 (KR) .......................... 10-2016-0055458

(51) Int. Cl.
*B67D 3/00* (2006.01)
*G05B 15/02* (2006.01)
*G05D 23/19* (2006.01)
*H05B 6/06* (2006.01)
*H05B 6/10* (2006.01)

(52) U.S. Cl.
CPC .......... *H05B 6/108* (2013.01); *B67D 3/0022* (2013.01); *B67D 3/0041* (2013.01); *G05B 15/02* (2013.01); *G05D 23/1917* (2013.01); *H05B 6/06* (2013.01); *B67D 2210/00005* (2013.01); *B67D 2210/00102* (2013.01)

(58) Field of Classification Search
CPC ................... B67D 3/0022; B67D 2210/00102
See application file for complete search history.

(56) References Cited

U.S. PATENT DOCUMENTS 4,880,535 A * 11/1989 Burrows ................ B01D 61/08
                                                      210/181
5,334,819 A *  8/1994 Lin ......................... F24H 1/121
                                                      219/628

(Continued)

FOREIGN PATENT DOCUMENTS

CN    201879495    6/2011
CN    203341557    12/2013

(Continued)

OTHER PUBLICATIONS

Chinese Office Action in Chinese Application No. 201710308239.9, dated Mar. 25, 2019, 19 pages (with English translation).

(Continued)

*Primary Examiner* — Jennifer L Norton
(74) *Attorney, Agent, or Firm* — Fish & Richardson P.C.

(57) ABSTRACT

A control device, for a water purifier, that dispenses hot water and that includes: an input unit that is configured to receive a command signal; and a controller that is configured to control the water purifier based on the command signal, wherein the controller is configured to: control power output of a heating unit that is configured to heat water stored in a hot water tank of the water purifier, and based on the power output of the heating unit, control temperature of hot water dispensed by the water purifier is disclosed.

7 Claims, 13 Drawing Sheets

(56) References Cited

U.S. PATENT DOCUMENTS

| | | | | |
|---|---|---|---|---|
| 5,855,795 A | * | 1/1999 | Chang | A61L 2/10 |
| | | | | 210/744 |
| 2010/0108713 A1 | * | 5/2010 | Grossbach | F24D 17/0031 |
| | | | | 222/1 |
| 2012/0138632 A1 | * | 6/2012 | Li | A47J 31/4403 |
| | | | | 222/64 |
| 2012/0224838 A1 | * | 9/2012 | Lee | F24D 19/1006 |
| | | | | 392/466 |
| 2014/0086565 A1 | * | 3/2014 | Lilley | B08B 9/08 |
| | | | | 392/449 |
| 2016/0146505 A1 | * | 5/2016 | Hill | F24H 9/2021 |
| | | | | 392/498 |
| 2017/0050835 A1 | * | 2/2017 | Moon | H05B 6/108 |
| 2018/0002153 A1 | * | 1/2018 | Kim | B67D 1/0888 |
| 2018/0279423 A1 | * | 9/2018 | De Angelis | H05B 6/06 |
| 2018/0354776 A1 | * | 12/2018 | Lee | B01D 35/005 |
| 2019/0329168 A1 | * | 10/2019 | Kang | B01D 61/02 |
| 2020/0165118 A1 | * | 5/2020 | Kim | B67D 1/0888 |

FOREIGN PATENT DOCUMENTS

| | | | | |
|---|---|---|---|---|
| CN | 203873580 | | 10/2014 | |
| CN | 104840101 | | 8/2015 | |
| CN | 201950555 | | 1/2016 | |
| CN | 205162786 | | 4/2016 | |
| WO | WO-2006101326 A1 | * | 9/2006 | G05D 23/1934 |
| WO | WO-2019151624 A1 | * | 8/2019 | B01D 1/0023 |

OTHER PUBLICATIONS

Indian Office Action in Indian Application No. 201741015177, dated Feb. 10, 2020, 6 pages (with English translation).

* cited by examiner

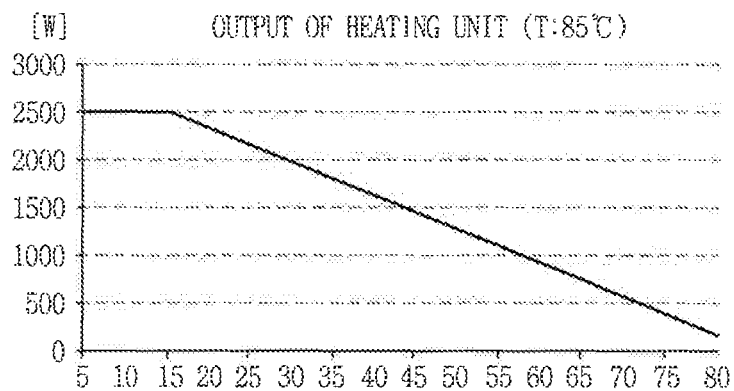
FIG. 2B
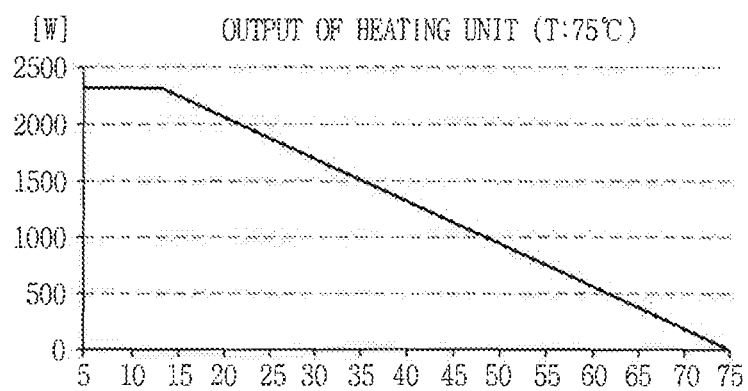
FIG. 2C
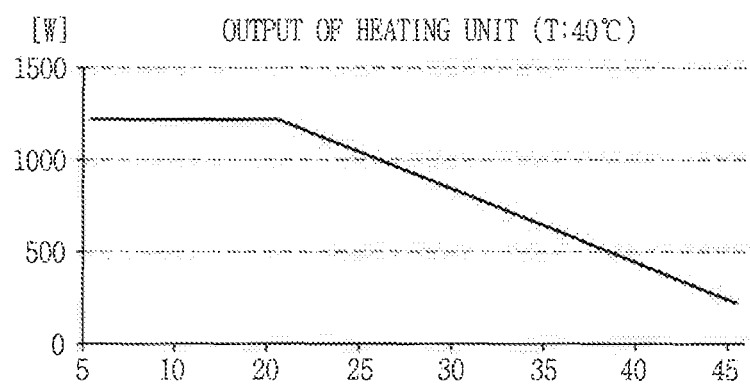

CONTROL DEVICE OF WATER PURIFIER, WATER PURIFIER, AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2016-0055458, filed on May 4, 2016, the entire content of which is incorporated by reference herein.

TECHNICAL FIELD

The present application relates to a water purifier.

BACKGROUND

A water purifier, a device for supplying cold water or hot water to a user, includes various components for supplying cold water or hot water. Components for supplying cold water may include a compressor, a filter, and a valve for cooling water introduced to the water purifier to lower a temperature of the water, and components for supplying hot water may include a hot water tank storing introduced water, a heating unit for heating the hot water tank to heat water stored in the hot water tank, and a controller controlling the hot water tank and the heating unit.

Regarding hot water heating in the related art water purifier, heat is generated by power output of the heating unit attached to the hot water tank and applied to the hot water tank to control a temperature of water stored in the hot water tank. The power output of the heating unit is fixed to a maximum value and water introduced to the hot water tank is adjusted to control a temperature of dispensed hot water. That is, the related art is a flow rate control method in which the power output of the heating unit is fixed to a maximum value to maintain heating of the hot water tank at a maximum level and a flow rate of water introduced to the hot water tank is adjusted to control a temperature of water stored and heated in the hot water tank, thereby controlling a temperature of dispensed hot water. However, since the power output of the heating unit is fixed and a temperature is controlled by adjusting a flow rate of water, the related art has the following limitations.

First, since a temperature is controlled by adjusting a flow rate, a temperature of dispensed hot water is not accurately controlled. Since there is a limitation in water introduced to the water purifier, it is difficult to easily control water to fit a target temperature, and since it is difficult for a temperature of water stored and heated in the hot water tank to be instantly changed through a change in a flow rate of water, it is difficult to accurately control a temperature to fit a temperature desired by a user or a set temperature.

Also, since the power output of the heating unit is fixed, an internal component of the water purifier may be overheated or damaged by heat generated by the heating unit, and thus, lifespan of the internal component may be shortened.

As a result, since the related art uses the method for controlling a flow rate, a temperature may not be easily controlled, and thus, it is difficult to rapidly/accurately control a temperature of dispensed hot water. In addition, continuous water introduction and maintaining of power output of the heating unit limit lifespan of the water purifier itself, having limitations in terms of reliability, convenience, utilization, and stability.

SUMMARY

In general, one innovative aspect of the subject matter described in this specification can be implemented in a control device of a water purifier that dispenses hot water, the control device comprising: an input unit that is configured to receive a command signal; and a controller that is configured to control the water purifier based on the command signal, wherein the controller is configured to: control power output of a heating unit that is configured to heat water stored in a hot water tank of the water purifier, and based on the power output of the heating unit, control temperature of hot water dispensed by the water purifier.

The foregoing and other implementations can each optionally include one or more of the following features, alone or in combination. In particular, one implementation includes all the following features in combination. The control device of claim 1, wherein the heating unit includes an induction heater. The controller is configured to: control the power output of the heating unit based on a set temperature of hot water dispensed by the water purifier, and wherein the command signal includes information regarding the set temperature. The controller is configured to: control a frequency or a phase of AC power supplied to the heating unit, and based on the frequency or the phase of AC power supplied to the heating unit, control the power output of the heating unit. The controller is configured to: detect the power output of the heating unit, determine whether the power output satisfies a preset output reference corresponding to the set temperature, and based on a determination that the power output satisfies the preset output reference, control the power output of the heating unit. The controller is configured to: determine whether the set temperature is changed from a first temperature to a second temperature within a preset time reference, and based on a determination that the set temperature is changed from the first temperature to the second temperature within the preset time reference, stop the power output of the heating unit.

In general, another innovative aspect of the subject matter described in this specification can be implemented in a control device of a water purifier that includes an inlet part through which purified water is introduced; a hot water tank that is configured to store water introduced through the inlet part; a heating unit that is configured to heat water stored in the hot water tank; a water dispense part that is configured to dispense hot water stored in the hot water tank; and a control device that is configured to: control power output of the heating unit, and based on the power output of the heating unit, control temperature of hot water dispensed by the water dispense part.

The foregoing and other implementations can each optionally include one or more of the following features, alone or in combination. In particular, one implementation includes all the following features in combination. The heating unit is an induction heater, and wherein the control device is configured to: control a frequency or a phase of AC power supplied to the heating unit, and based on the frequency or the phase of AC power supplied to the heating unit, control the power output of the heating unit. The control device is configured to: control the power output of the heating unit based on a set temperature of hot water dispensed by the water dispense part. The control device is configured to: detect a first flow rate of water introduced to the hot water tank and a second flow rate of water dispensed from the hot water tank, compare the first flow rate to the second flow rate, and based on a comparison of the first flow rate to the second flow rate, reduce the power output of the heating unit. The control device is configured to: detect a first temperature of hot water dispensed from the hot water tank, determine whether the first temperature satisfies a first temperature reference, and based on a determination that the first temperature satisfies the first temperature reference, reduce the power output of the heating unit at a predetermined time interval to match the first temperature to the first temperature reference. The control device is configured to: detect a second temperature of the control device, determine whether the second temperature satisfies a second temperature reference, and based on a determination that the second temperature satisfies the second temperature reference, stop the power output of the heating unit. The control device is configured to: detect a third temperature of the hot water tank, determine whether the third temperature satisfies a third temperature reference, and based on a determination that the third temperature satisfies the third temperature reference, stop the power output of the heating unit. The water purifier further includes: a flow rate valve that is configured to adjust a flow rate of water introduced to the hot water tank, wherein the control device is configured to adjust an angle of the flow rate valve relative to ground based on (i) the flow rate of water introduced to the hot water tank and (ii) an amount of water stored in the hot water tank. The control device is configured to: detect the flow rate of water introduced to the hot water tank, based on the flow rate of water introduced to the hot water tank, calculate the angle of the flow rate valve and a control value of the flow rate valve, based on the angle and the control value, determine an initial angle of the flow rate valve, and adjust the angle of the flow rate valve relative to ground based on (i) the flow rate of water introduced to the hot water tank and (ii) the amount of water stored in the hot water tank. The control device is configured to: detect a time period since hot water has been dispensed from the hot water tank, determine whether the time period satisfies a predetermined period of time, determine whether a difference between a first temperature of water introduced to the hot water tank and a second temperature of hot water dispensed from the hot water tank satisfies a preset difference reference, and based on a determination that the time period satisfies the predetermined period of time and a determination that the difference between the first temperature and the second temperature satisfies the preset difference reference, control (i) a flow rate of water introduced to the hot water tank and (ii) the power output of the heating unit by stages.

In general, another innovative aspect of the subject matter described in this specification can be implemented in a control method of a water purifier, the control method comprising: receiving purified water; storing received water in a hot water tank of the water purifier; obtaining a set temperature of hot water dispensed from the hot water tank, controlling a frequency or a phase of AC power supplied to a heating unit of the water purifier, wherein the heating unit is configured to heat water stored in the hot water tank based on the set temperature and includes an induction heater; and based on the frequency or the phase of AC power supplied to the heating unit, controlling power output of the heating unit; based on the power output of the heating unit, controlling temperature of hot water dispensed from the hot water tank; and dispensing hot water from the hot water tank.

The foregoing and other implementations can each optionally include one or more of the following features, alone or in combination. In particular, one implementation includes all the following features in combination. Controlling the power output of the heating unit includes: detecting the power output of the heating unit; determining whether the power output satisfies a preset output reference corresponding to the set temperature; and based on a determination that the power output satisfies the preset output reference, controlling the power output of the heating unit. Controlling the power output of the heating unit includes: determining whether the set temperature is changed from a first temperature to a second temperature within a preset time reference, and based on a determination that the set temperature is changed from the first temperature to the second temperature within the preset time reference, stopping the power output of the heating unit. The control method further includes: detecting a flow rate of water introduced to the hot water tank; based on the flow rate of water introduced to the hot water tank, calculating an angle of a flow rate valve relative to ground and a control value of the flow rate valve; based on the angle and the flow rate valve, determining an initial angle of the flow rate valve, and adjusting the angle of the flow rate valve based on (i) the flow rate of water introduced to the hot water tank and (ii) an amount of water stored in the hot water tank.

The subject matter described in this specification can be implemented in particular examples so as to realize one or more of the following advantages. Comparing to a conventional water purifier, a water purifier including a control device can efficiently heat water and easily control temperature using induction heating technology. In addition, the water purifier including the control device can control temperature of hot water accurately. Moreover, the water purifier controls temperature of hot water based on power output of a heating unit of the water purifier so the temperature can be efficiently and instantly controlled and damage caused by delayed temperature control can be prevented.

BRIEF DESCRIPTION OF THE DRAWINGS

FIGS. 2A to 2C are graphs illustrating example power output of a heating unit and temperature of hot water controlled by a control device of a water purifier.

Like reference numbers and designations in the various drawings indicate like elements.

DETAILED DESCRIPTION

Figure 1:
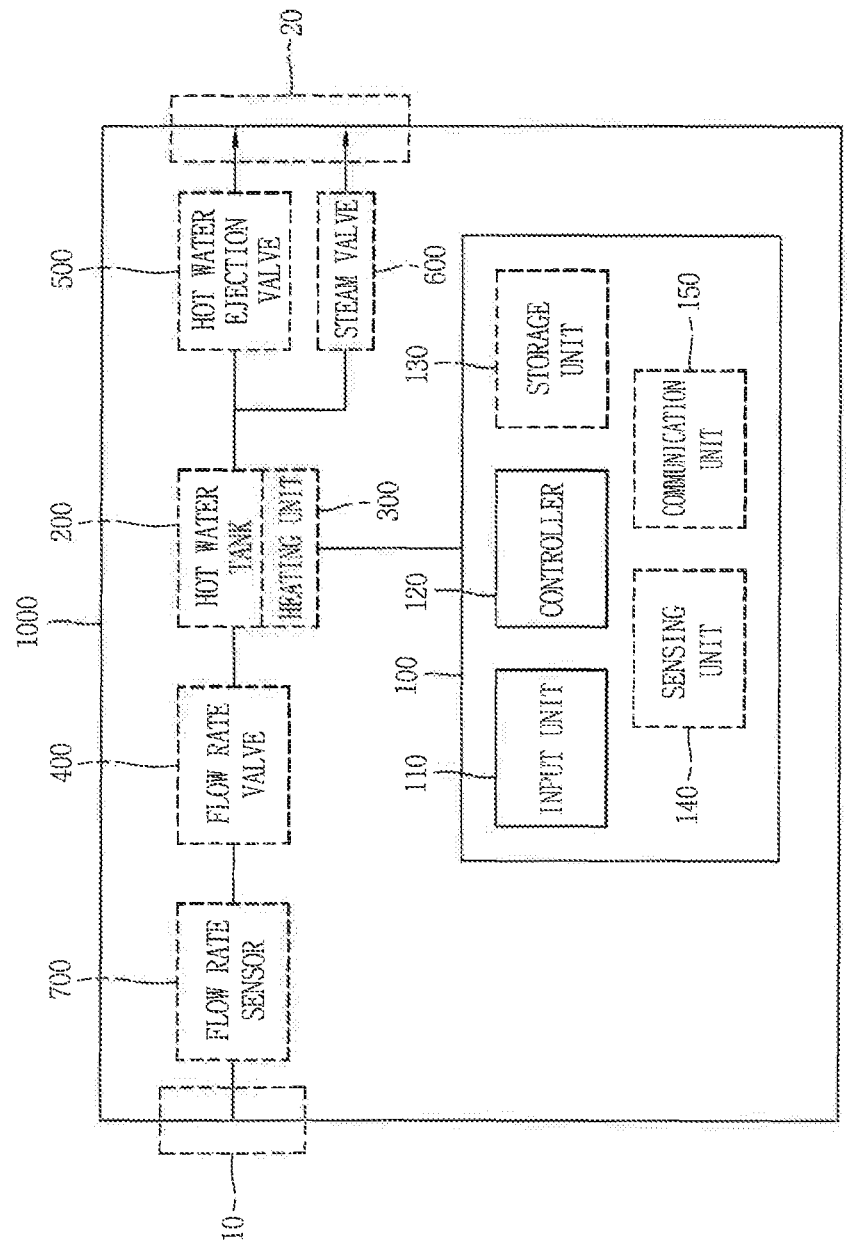
FIG. 1 is a diagram illustrating an example control device of a water purifier.
Figure 3:
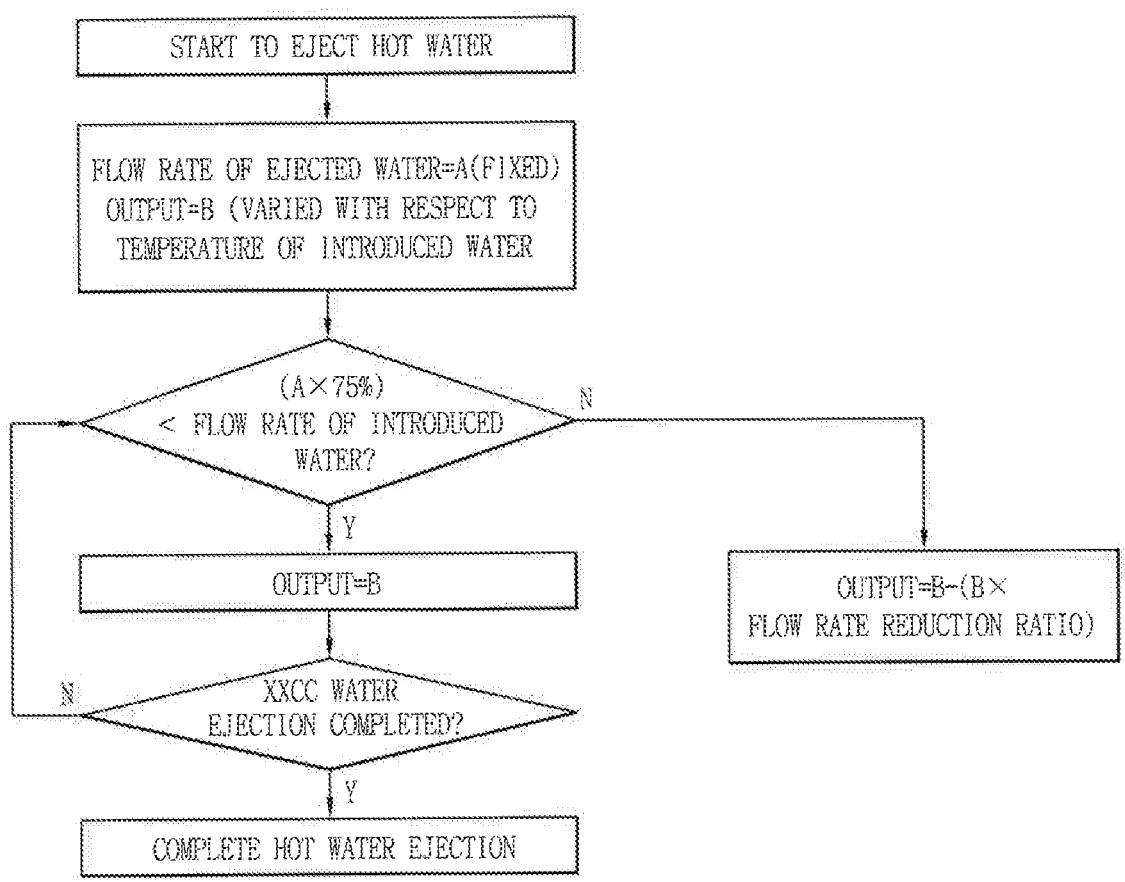
FIG. 3 is a flowchart illustrating an example method of controlling power output of a heating unit by a control device of a water purifier.
Figure 4:
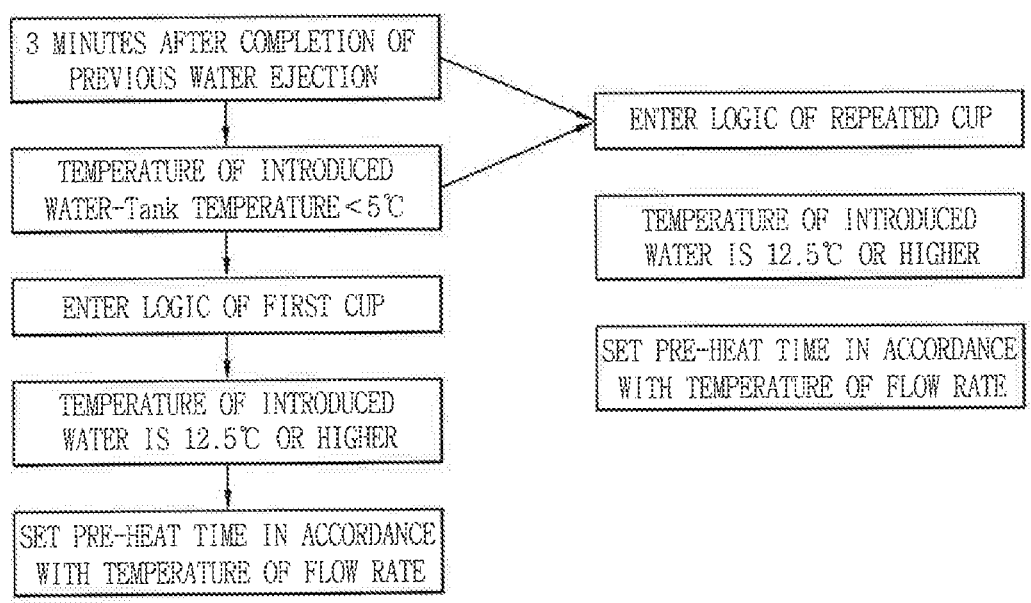
FIG. 4 is a flowchart illustrating another example method of controlling power output of a heating unit by a control device of a water purifier.
Figure 5:
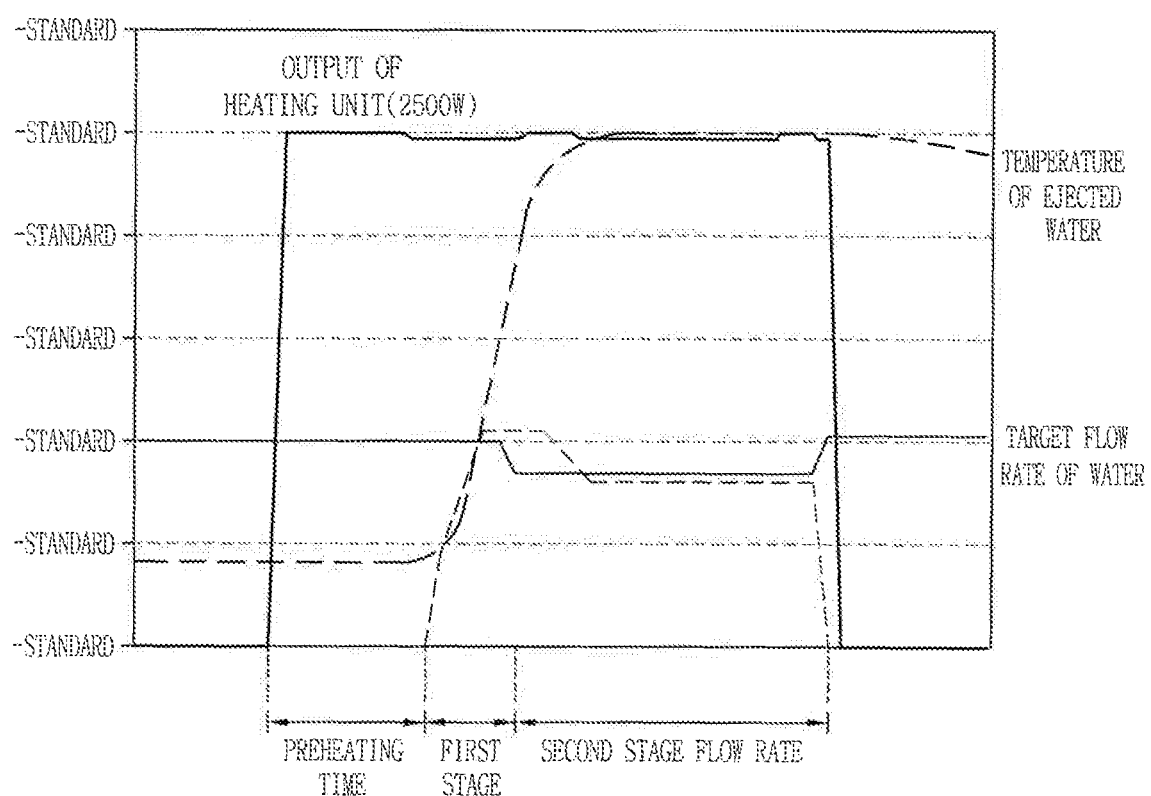
FIG. 5 is a graph illustrating example flow rate of water and power output of a heating unit controlled by a control device of a water purifier.
Figure 6A:
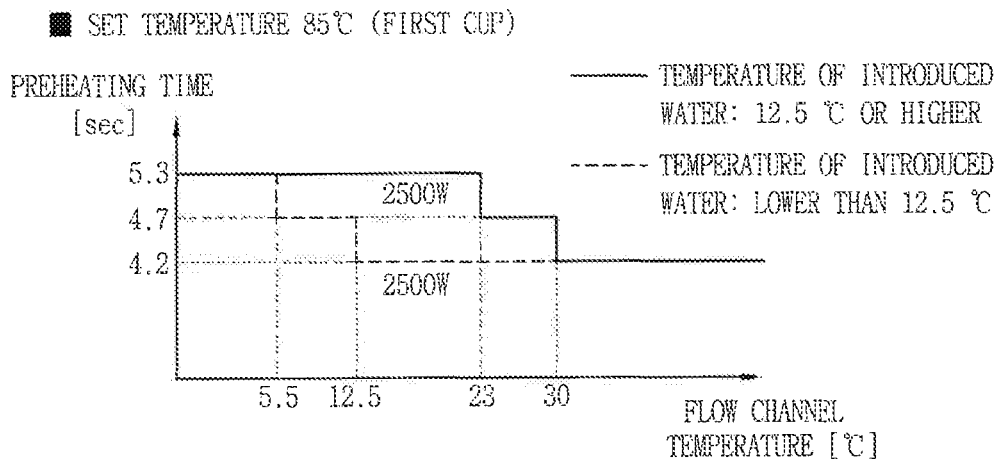
FIGS. 6A to 6C are graphs illustrating example pre-heating time and flow channel temperature.
Figure 6B:
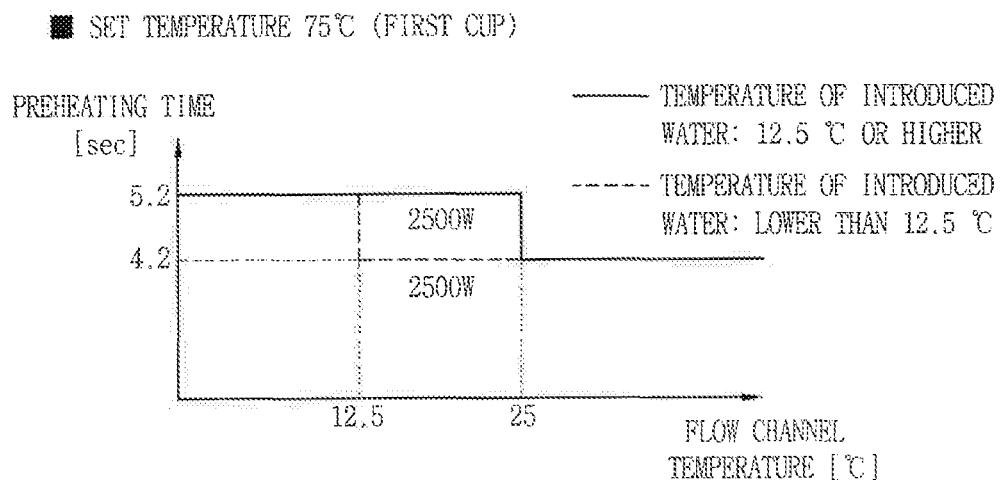
Figure 6C:
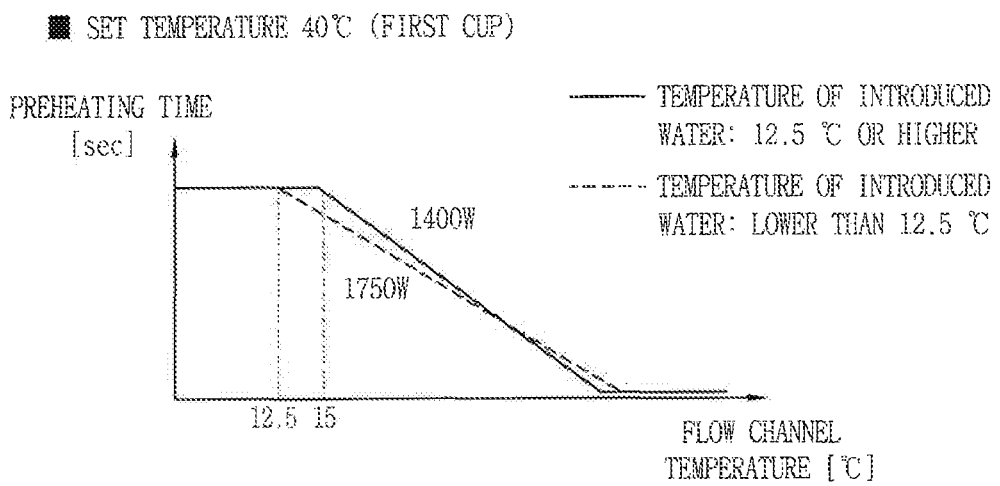
Figure 7A:
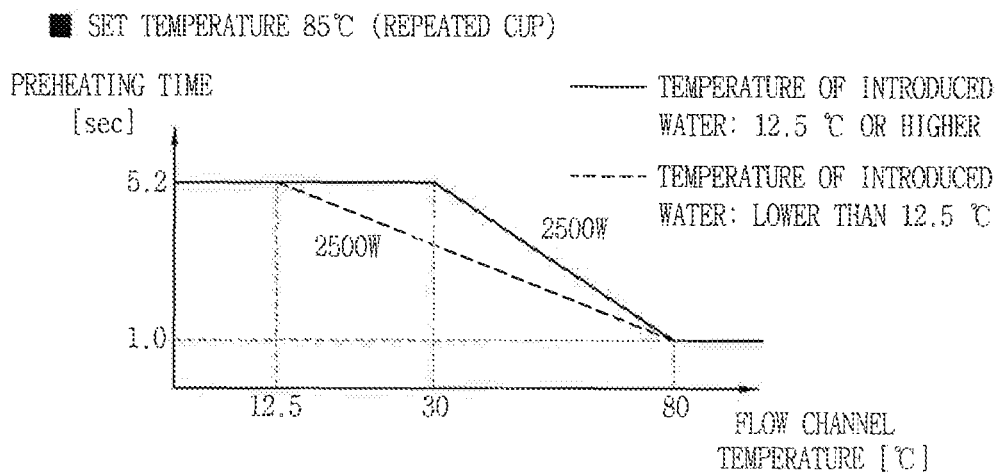
FIGS. 7A to 7C are graphs illustrating another example of pre-heating time and flow channel temperature.
Figure 7B:
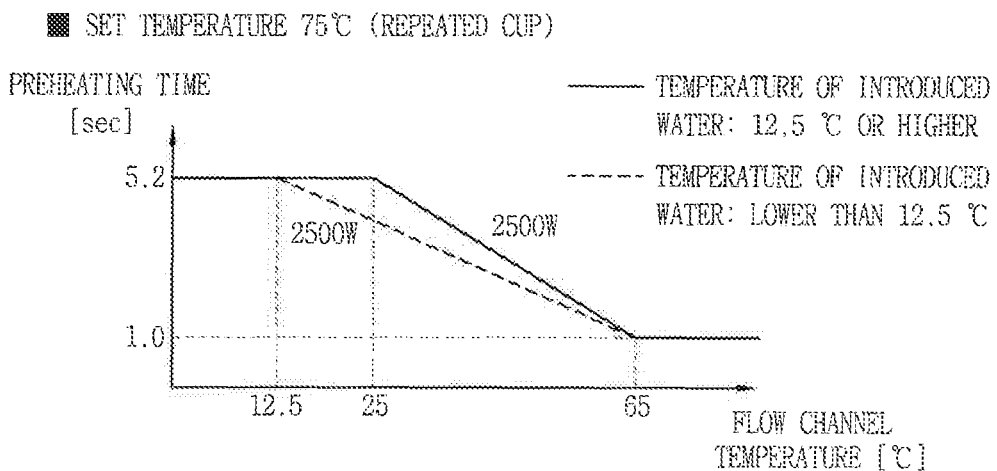
Figure 7C:
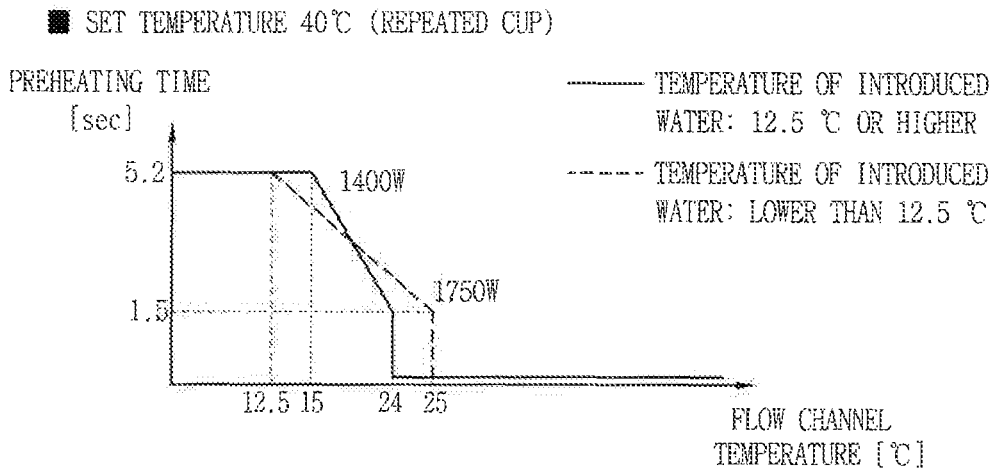

FIG. 1 illustrates an example control device of a water purifier. FIGS. 2A to 2C illustrates example power output of a heating unit and temperature of hot water controlled by a control device of a water purifier. FIG. 3 illustrates an example method of controlling power output of heating unit by a control device of a water purifier. FIG. 4 illustrates another example method of controlling power output of a heating unit by a control device of a water purifier. FIG. 5 illustrates example flow rate of water and power output of a heating unit controlled by a control device of a water purifier. FIGS. 6A to 6C illustrate example pre-heating time and flow channel temperature. FIGS. 7A to 7C illustrate another example of pre-heating time and flow channel temperature.

A control device of a water purifier disclosed in this application may be a control device of a water purifier.

The water purifier may be a water purification device dispensing (or dispensing) cold water or hot water.

The control device may be a control device controlling an operation of the water purifier.

That is, the control device may be a main board or a microcomputer of the water purifier, or a central processing unit including the main board or the microcomputer.

The control device may include one or more modules for controlling an operation of the water purifier, or a unit for including the modules.

The control device may control general operations of the water purifier, including control of a flow rate, cold water cooling, hot water heating, valve opening and closing, filtering, and the like.

In particular, the control device controls a temperature of hot water dispensed from the water purifier.

As illustrated in FIG. 1, the control device 100 may be included in the water purifier 1000.

First, referring to a configuration of the water purifier 1000, the water purifier 1000 may include an inlet part 10 through which purified water which has passed through a filter is introduced, a water dispense part 20 from which cold water or hot water is outwardly dispensed, the control device 100 controlling an operation of the water purifier 1000, a hot water tank 200 storing hot water dispensed from the water purifier 1000, and a heating unit 300 heating the hot water tank 200, and may further include a flow rate valve 400 controlling a flow channel through which purified water is introduced to the hot water tank 200 from the filter or adjusting a flow rate of water, a hot water dispense valve 500 controlling a flow channel through which hot water is outwardly dispensed from the hot water tank 200, a steam valve 600 controlling a flow channel through which steam generated in the hot water tank 200 and a flow channel through which hot water is dispensed is discharged outwardly, and a flow rate sensor 700 sensing a flow rate of introduced water.

The control device 100 includes an input unit 110 to which a command signal to control an operation of the water purifier 1000 is input and a controller 120 controlling an operation of the water purifier 1000 on the basis of the command signal.

The input unit 110 may receive a command signal regarding an operation of the water purifier 1000 from the outside of the control device 100.

For example, a command regarding cold water cooling or hot water heating based on a user operation of the water purifier 1000 may be input.

Also, a sensing signal or a control signal may be input from a sensor or another module provided in the water purifier 1000 to the input unit 110.

The command signal input to the input unit may be delivered to the controller 120.

The controller 120 may control an operation of the water purifier 1000 on the basis of the processing treatment received from the input unit 110.

The control device 100 may further include one or more of a storage unit 130 storing data processed in the controller 120 or data regarding an operation of the water purifier 1000, a sensing unit 140 sensing one or more state values of the water purifier 1000 through one or more sensors provided in the water purifier, and a communication unit 150 communicating with an external device.

The storage unit 130 may be a memory device storing data regarding controlling of the controller 120. For example, the storage unit 130 may be an EEPROM.

The sensing unit 140 may include a temperature sensor sensing one or more state values of the water purifier 1000 or sensing a temperature of the controller 120 itself.

The communication unit 150 may be a communication module for performing communication with an external user terminal or another home appliance.

The storage unit 130, the sensing unit 140, and the communication unit 150 are components assisting a control operation of the controller 120, and the control device 100 may further include any other component related to a control operation of the controller 120 in addition to the aforementioned components or a component similar thereto.

In the control device 100, the controller 120 controls an operation of the water purifier 1000 on the basis of the command signal, and controls power output of the heating unit 300 heating the hot water tank 200 to control a temperature of dispensed hot water.

The hot water tank 200 may be a flow tank storing purified water which has passed through a filter installed within the water purifier 1000, and the purified water stored in the hot water tank 200 may be heated to hot water and subsequently dispensed.

The heating unit 300 may be a heating device heating the hot water tank 200 and heating hot water stored in and dispensed from the hot water tank 200.

That is, the controller 120 may control power output of the heating unit 300 heating the hot water tank 200 and control a temperature of the dispensed hot water stored in the hot water tank 200.

The command signal may be a command regarding a set temperature of the dispensed hot water.

That is, the controller 120 may control a temperature of hot water by controlling power output of the heating unit 300 based on the command signal regarding a set temperature of hot water dispensed from the water purifier 1000.

For example, when the command signal for setting the dispensed hot water to X° C. is input, the controller 120 may control power output of the heating unit 300 to heat hot water stored in and dispensed from the hot water tank 200 is heated to the x° C.

The set temperature may be any one of 85° C., 75° C., and 40° C.

That is, the controller 120 may control power output of the heating unit 300 such that hot water stored in and dispensed from the hot water tank 200 is heated to a temperature of any one of 85° C., 75° C., and 40° C., and the water purifier 1000 may dispense hot water at a temperature of any one of 85° C., 75° C., and 40° C.

The heating unit 300 whose output is controlled by the controller 120 may be an induction heater.

The induction heater may refer to an induction heater heating a metal body in contact therewith by generating Joule heat through an induced current generated by a magnetic field when a high frequency AC current is applied thereto.

Here, the metal body in contact with the heating unit 300 may be the hot water tank 200.

That is, in the water purifier 1000, the hot water tank 200 may be in contact with the heating unit 300, and the heating unit 300 may generate heat to the hot water tank 200 based on applied AC power to heat the hot water tank 200.

The heating unit 300 may heat the hot water tank 200 based on.

For example, when power output of the heating unit 300 is X, heat in an amount corresponding to the output X may be generated in the hot water tank 200 to heat the hot water tank 200.

The controller 120 may control power output of the heating unit 300 by controlling AC power applied to the heating unit 300.

The controller 120 may variably control power output of the heating unit 300 based on a set temperature of dispensed hot water input based on the command signal.

For example, when the set temperature is 85° C., the controller 120 may variably control power output of the heating unit 300 such that the heating unit 300 heats hot water dispensed from the hot water tank 200 to 85° C.

That is, power output of the heating unit 300 may be variably controlled by the controller 120.

The controller 120 may variably control power output of the heating unit 300 by variably controlling a frequency or a phase of AC power applied to the heating unit 300.

For example, the controller 120 may variably control power output of the heating unit 300 by variably controlling a frequency of an AC current applied to the heating unit 300.

In detail, the controller 120 may variably control power output of the heating unit 300 such that the power output of the heating unit 300 is decreased or increased over time.

An example of such controlling is described with reference to FIGS. 2A to 2C.

FIG. 2A illustrates an example of varying power output of the heating unit 300 when the set temperature is set to 85° C., FIG. 2B illustrates an example of varying power output of the heating unit 300 when the set temperature is set to 75° C., and FIG. 2C illustrates an example of varying power output of the heating unit 300 when the set temperature is set to 40° C.

As illustrated in FIG. 2A, when the set temperature is 85° C., the controller 120 may control power output of the heating unit 300 to be 2500 W and variably control the power output of the heating unit 300 to be gradually decreased from the output 2500 W with the lapse of time so that heating of the hot water tank 200 is reduced. As illustrated in FIG. 2B, when the set temperature is 75° C., the controller 120 may control power output of the heating unit 300 to be 2300 W and variably control the power output of the heating unit 300 to be gradually decreased from the output 2300 W with the lapse of time so that heating of the hot water tank 200 is reduced. As illustrated in FIG. 2C, when the set temperature is 40° C., the controller 120 may control power output of the heating unit 300 to be 1250 W and variably control the power output of the heating unit 300 to be gradually decreased from the output 1250 W with the lapse of time so that heating of the hot water tank 200 is reduced.

In this manner, since the controller 120 variably controls power output of the heating unit 300, overheat of the hot water tank 200 may be prevented, and a temperature of the dispensed water may be controlled to be uniformly maintained.

The controller 120 may detect power output of the heating unit 300 based on the set temperature and compare the detected output with a preset output reference to correct the power output of the heating unit 300 based on the comparison result.

The preset output reference may refer to an error range reference with respect to power output of the heating unit 300 in accordance with the set temperature.

For example, the preset output reference may be a reference power output of the heating unit 300 in accordance with the preset temperature ±10 W.

When the detected output exceeds or falls short of the preset output reference, the controller 120 may correct power output of the heating unit 300 to be within the preset output reference.

That is, the controller 120 may feedback-control power output of the heating unit 300.

For example, it is assumed that the preset output reference is set to 2490 to 2510 W, the set temperature is 85° C., and power output of the heating unit 300 is controlled to be 2500 W in accordance with the set temperature. Here, when power output of the heating unit 300 is detected as 2520 W, since the detected output exceeds the preset output reference 2510 W, the controller 120 corrects the power output of the heating unit 300 to be within 2510 W.

When the power output of the heating unit 300 is controlled to be corrected, the controller 120 may store the corrected value in the storage unit 130.

The corrected value stored in the storage unit 130 may be used as a basis for the controller 120 to correct power output of the heating unit later.

When the set temperature is changed from a high temperature to a low temperature within a preset time reference, the controller 120 may stop the power output of the heating unit 300.

The preset reference time may refer to a time reference during which a temperature of the hot water tank 200 is maintained at a high temperature when the set temperature is changed from a high temperature to a low temperature. The preset time reference may be 3 minutes, for example.

The case in which the set temperature is changed from a high temperature to a low temperature within the preset time reference may be a case in which the set temperature is changed from 85° C. to 40° C. within 3 minutes, the preset time reference.

Based on this example, when the set temperature initially set to 85° C. is changed to 40° C. within 3 minutes, the preset time reference, the controller 120 may stop the power output of the heating unit 300 whereby the heating unit 300 does not heat the hot water tank 200 based on the set temperature changed to a low temperature.

That is, when the set temperature is changed from a high temperature to a low temperature, since hot water dispensed from the hot water tank 200 is maintained at the high temperature due to the set temperature before the change, the controller 130 may stop the power output of the heating unit, whereby hot water dispensed from the hot water tank 200 may not be maintained at the high temperature and have a low temperature based on the change set temperature.

When the set temperature is changed from the high temperature to the low temperature after the lapse of the preset time reference, the controller 120 may control power output of the heating unit 300 based on a result of detection of a temperature of the hot water tank 200.

The controller 120 may variably control power output of the heating unit 300 based on a flow rate of water introduced to the hot water tank 200 and a flow rate of water dispensed from the hot water tank 200.

That is, the controller may variably control power output of the heating unit 300 based on an amount of water stored in the hot water tank 200.

The controller 120 may detect the flow rate of introduced water and the flow rate of dispensed water through a flow rate detection unit detecting a flow rate of water introduced to the hot water tank 200 and a flow rate detection unit detecting a flow rate of water dispensed from the hot water tank 200.

The controller 120 may detect a flow rate of water introduced to the hot water tank 200 and a flow rate of water dispensed from the hot water tank 200, and compare the detected flow rate of introduced water and the detected flow rate of dispensed water to variably control power output of the heating unit 300 based on the comparison result.

When comparing the flow rate of introduced water and the flow rate of dispensed water, the controller 120 may compare the flow rate of introduced water with the product of the flow rate of dispensed water and a preset reference rate.

The preset reference rate is an appropriate rate reference of the flow rate of dispensed water with respect to the flow rate of introduced water, and may be 75%, for example.

When the flow rate of introduced water falls short of the flow rate of dispensed water based on the comparison result, the controller 120 may reduce power output of the heating unit 300 by the insufficient ratio.

For example, when the flow rate of introduced water does not reach 75% of the flow rate of dispensed water, the controller 120 may reduce power output of the heating unit 300 by an insufficient ratio with respect to 75% of the flow rate of dispensed water.

A control example of the controller 120 is illustrated in FIG. 4.

As illustrated in FIG. 4, when hot water heated based on the set temperature is dispensed from the hot water tank 200, the controller 120 detects a flow rate of introduced water and a flow rate of dispensed water and compares the flow rate of introduced water with 75% of the flow rate of dispensed water. When the flow rate of introduced water is equal to or greater than 75% of the flow rate of dispensed water, the controller 120 maintains power output of the heating unit 300 to maintain heating of the hot water tank 200. Also, when the flow rate of introduced water does not reach 75% of the flow rate of dispensed water, the controller 120 may reduce the power output of the heating unit 300 by an insufficient ratio with respect to the 75% of the flow rate of dispensed water to reduce heating of the hot water tank 200 to complete dispensing of hot water.

Since the controller 120 reduces the power output of the heating unit 300 by the insufficient ratio of the flow rate of introduced water with respect to 75% of the flow rate of dispensed water, heating of the hot water tank 200 may be reduced by the reduced amount of water stored in the hot water tank 200, thus preventing heating of hot water dispensed from the hot water tank 200.

The controller 120 may variably control power output of the heating unit 300 based on a temperature of dispensed hot water.

The controller 120 may detect a temperature of dispensed hot water through a detection unit detecting a temperature of hot water dispensed from the hot water tank 200.

That is, the controller 120 may variably control power output of the heating unit 300 based on a result of detecting a temperature of hot water dispensed from the hot water tank 200.

The controller 120 may detect a temperature of hot water dispensed from the hot water tank 200 and compare the detected temperature with a preset first temperature reference to variably control power output of the heating unit 300 based on the comparison result.

The first temperature reference may refer to a maximum allowable temperature reference of hot water dispensed from the water purifier 1000 and may be 95° C., for example.

When the detected temperature exceeds the first temperature reference based on the comparison result, the controller 120 may reduce power output of the heating unit 300 at a predetermined time interval until the temperature of the dispensed hot water is reduced to the first temperature reference.

For example, when the detected temperature exceeds the first temperature reference, the controller 120 may reduce power output of the heating unit 300 at a predetermined time interval until a temperature of dispensed hot water is equal to or lower than 95° C.

When the detected temperature exceeds the first temperature reference based on the detection result, the controller 120 may reduce power output of the heating unit 300 at a predetermined time interval based on a temperature of the dispensed hot water.

For example, when a temperature of the dispensed hot water is lower than 97 or 98° C., the controller 120 may reduce power output of the heating unit 300 by 30 W per second. When temperature of the dispensed hot water is lower than 98 or 99° C., the controller 120 may reduce power output of the heating unit 300 by 50 W per second. When a temperature of the dispensed hot water exceeds 99° C., the controller 120 may reduce power output of the heating unit 300 by 100 W per second.

The controller 120 may variably control power output of the heating unit based on an internal temperature of the water purifier 1000.

Here, an internal temperature of the water purifier 1000 may refer to a temperature of the control device 100 or the hot water tank 200.

That is, the controller 120 may variably control power output of the heating unit 300 based on a temperature of the control device 100 or the hot water tank 200 whose temperature is increased when affected by power output of the heating unit 300 among internal components of the water purifier 1000.

The controller 120 may detect a temperature of the control device 100 and compare the detected temperature with a preset second temperature reference. When the detected temperature exceeds the second temperature reference based on a comparison result, the controller 120 may stop the power output of the heating unit 300.

The controller 120 may detect a temperature of the control device 100 through a temperature detection unit, for example, the sensing unit 140, included in the control device 100.

The second temperature reference may refer to a maximum allowable reference temperature at which the control device 100 normally operates.

When the detected temperature exceeds the second temperature reference, the controller may stop the power output of the heating unit 300 to reduce a temperature of the control device 100.

When the detected temperature exceeds the second temperature reference, the controller may stop the power output of the heating unit 300 to thereby prevent overheat of an element vulnerable to heating among circuit components included in the control device 100, for example, a semiconductor such as a diode or an IGBT.

The controller 120 may also detect a temperature of the hot water tank 200 and compare the detected temperature with a preset third temperature reference. When the detected temperature exceeds the third temperature reference based on the comparison result, the controller 120 may stop the power output of the heating unit 300.

The controller 102 may detect a temperature of the hot water tank 200 through a temperature detection unit detecting a temperature of the hot water tank 200.

The third temperature reference may refer to a maximum allowable reference temperature at which the hot water tank 200 normally operates.

When the detected temperature exceeds the third temperature reference, the controller 120 may stop the power output of the heating unit 300 to reduce a temperature of the hot water tank 200.

When the detected temperature exceeds the third temperature reference, the controller 120 may stop or reduce the power output of the heating unit 300. Thus, the controller 120 can prevent overheat of the hot water tank 200.

The control device 100 can control the power output of the heating unit 300 as described above while the water purifier 1000 heats hot water based on the set temperature and dispenses hot water. In some implementations, the control methods of the control device 100 described above can be implemented by combining two or more methods together.

In another implementation of the control device 100, the water purifier 1000 may include a flow rate valve 400 adjusting a flow rate of water introduced to the hot water tank 200 as described above, and the controller 120 may adjust an angle of the flow rate valve 400 based on a flow rate of water introduced to the hot water tank 200 in an environment in which the water purifier 1000 is installed or an amount of water stored in the hot water tank 200.

When the water purifier 1000 is initially installed, the controller 120 may detect a flow rate of water introduced to the hot water tank 200, calculate an angle of the flow rate valve 400 and an appropriate control value on the basis of the detected flow rate of introduced water, set an initial angle of the flow rate valve 400 on the basis of the calculated angle and appropriate control value, and adjust an angle of the flow rate valve 400.

That is, when the water purifier 1000 is initially installed, the controller 102 may detect a flow rate of water introduced into the hot water tank 200 in an environment in which the water purifier 100 is installed, to calculate an angle of the flow rate valve 400 and an appropriate control value based on the detected flow rate of introduced water, set an initial angle of the flow rate valve 400 on the basis of the calculated angle and appropriate control value to allow a flow rate of flow to be introduced to the hot water tank 200 based on the set initial angle, and adjust an angle of the flow rate valve 400 based on the flow rate of introduced water and an amount of water stored in the hot water tank 200 on the basis of the appropriate control value, to control a flow rate of water to be continuously introduced to the hot water tank 200, whereby hot water may be controlled to be continuously dispensed from the hot water tank 200.

When the water purifier 1000 is initially installed, the controller 120 may store the calculated angle and appropriate control value in the storage unit 130.

The calculated angle and appropriate control value stored in the storage unit 130 may be used as a basis for the controller 120 to set and control an angle of the flow rate valve 400, when the water purifier 1000 is re-installed or re-set later.

After hot water is first dispensed from the hot water tank 200, the controller 120 may control a flow rate of water introduced to the hot water tank 200 and power output of the heating unit 300 based on a difference between a temperature of water introduced to the hot water tank 200 and a temperature of hot water dispensed from the hot water tank 200.

In some implementations, where hot water is firstly dispensed, it may mean that hot water is previously dispensed from the water purifier 1000.

In some other implementations, where hot water is secondly dispensed with the lapse of a predetermined time after hot water is firstly dispensed from the hot water tank, if a difference between a temperature of water introduced to the hot water tank and a temperature of hot water dispensed from the hot water tank is smaller than a preset difference reference, the controller 120 may control a flow rate of water introduced to the hot water and power output of the heating unit 300 by stages.

The predetermined period of time may refer to a time reference for determining whether secondly dispensed hot water after hot water is first dispensed is for a first cup or a successive cup (repeated cup), and may be 3 minutes, for example.

The preset difference reference may refer to a temperature reference for determining whether secondly dispensed hot water after hot water is first dispensed is for a first cup or a successive cup (repeated cup), and may be 5° C., for example.

As illustrated in FIG. 4, after the predetermined period of time has lapsed, when a difference between a temperature of water introduced to the hot water tank 200 and a temperature of hot water dispensed from the hot water tank 200 is smaller than a preset difference reference, the controller 120 may determine that the secondly dispensed water is for the first cup and control a flow rate of water introduced to the hot water tank 200 and power output of the heating unit 300 by stages.

Also, as illustrated in FIG. 4, before the predetermined period of time does not lapse yet or after the predetermined period of time has lapsed. if the difference between a temperature of water introduced to the hot water tank 200 and a temperature of hot water dispensed from the hot water tank 200 exceeds the preset difference reference, the controller 120 may determine that the secondly dispensed water is for a successive cup (repeated cup), and control the power output of the heating unit 300 continuously.

When it is determined that the secondly dispensed water is for the first cup, the controller 120 controls a flow rate of water introduced to the hot water tank and power output of the heating unit 300 by stages based on a temperature of the water introduced to the hot water tank 200.

When the secondly dispensed water is water for the first cup and a temperature of water introduced to the hot water tank 200 is equal to or higher than a preset water temperature reference, the controller 120 may control the flow rate of water to be introduced by stages and set a preheating time for power output of the heating unit 300 based on a temperature of introduced water and control the same.

The preset water temperature reference is a temperature reference for determining whether the preheating time is required, and may be 12.5° C.

The preheating time may refer to a heating time for preventing a decrease in temperature of the hot water tank 200 due to introduction of water, while water is being introduced.

As illustrated in FIG. 5, when it is determined that the secondly dispensed water is for the first cup and a temperature of water introduced to the hot water tank 200 is equal to or greater than a preset water temperature reference, the controller 120 may control power output of the heating unit 300 based on the set temperature to preheat the hot water tank 200 while water is being introduced, and here, the controller may set the preheat time based on a temperature of introduced water to preheat the hot water tank 200 by the preheat time, and the controller 120 may control introduced water by stages such that, in a first stage, water is introduced at a predetermined slope up to a target flow rate of water, and thereafter, in a second stage, the target flow rate of water is lowered and water is introduced slowly.

Also, when it is determined that the secondly dispensed water is for the successive cup (repeated cup) and a temperature of water introduced to the hot water tank 200 is equal to or higher than the preset water temperature reference, the controller 120 may set and control a preheat time in the power output of the heating unit 300 based on a temperature of the introduced water.

When it is determined that the secondly dispensed water is for the first cup or the successive cup (repeated cup), the preheat time may be set as illustrated in FIGS. 6 and 7, for example.

FIG. 6A illustrates setting of a preheat time when the set temperature of the first cup is 85° C., FIG. 6B illustrates setting of a preheat time when the set temperature of the first cup is 75° C., FIG. 6C illustrates setting of a preheat time when the set temperature of the first cup is 40° C., FIG. 7A illustrates setting of a preheat time when the set temperature of the successive cup (repeated cup) is 85° C., FIG. 7B illustrates setting of a preheat time when the set temperature of the successive cup (repeated cup) is 75° C., and FIG. 7C illustrates setting of a preheat time when the set temperature of the successive cup (repeated cup) is 40° C.

The settings of the preheat time as illustrated in FIGS. 6 and 7 are examples and can be set as any suitable settings.

Figure 8:
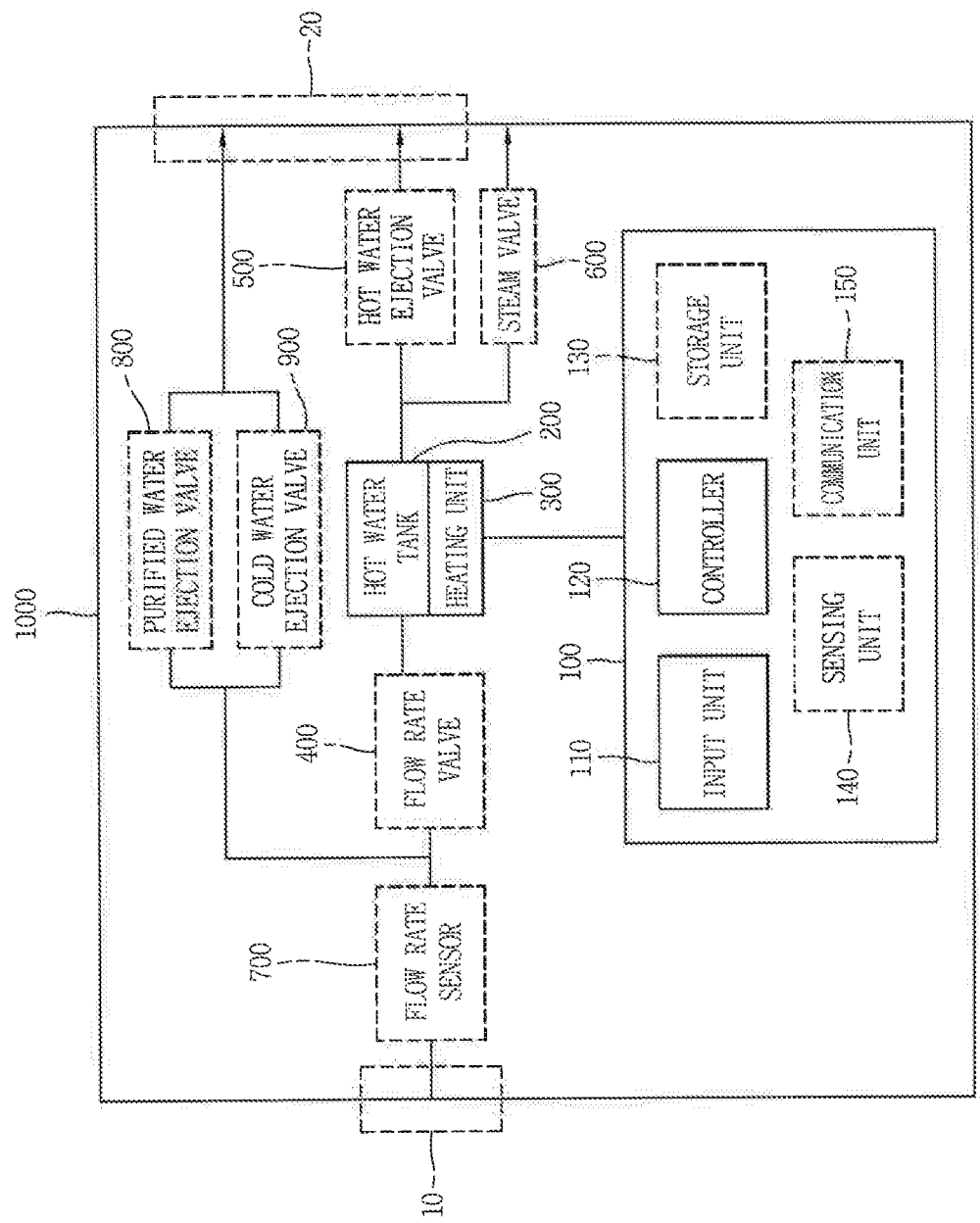
FIG. 8 is a diagram illustrating an example water purifier.

FIG. 8 illustrates an example water purifier.

The water purifier 1000 can be the same as the water purifier described above and can have the following differences. The water purifier 1000 can have other differences not described below.

The water purifier 1000 may include the control device 100 described above.

As illustrated in FIG. 8, the water purifier includes an inlet part 10 through which purified water which has passed through a filter is introduced, a hot water tank 200 storing purified water introduced from the inlet part 10, a water dispense part 20 from which hot water stored in the hot water tank 200 is dispensed, a heating unit 300 heating the hot water tank 200, and a control device 100 controlling power output of the heating unit 300 to control a temperature of dispensed hot water.

The inlet part 10 may be a hose or a pipe forming a flow channel along which purified water dispensed from a filter installed within the water purifier 100 flows.

The inlet part 10 and the hot water tank 200 are connected by a flow channel, and purified water introduced through the inlet part may be stored in the hot water tank 200.

The water dispense part 20 may be a water dispense part through which cold water or hot water is dispensed from the water purifier 1000.

The water dispense part 20 and the hot water tank 200 are connected by a flow channel, and hot water stored in the hot water tank 200 may be dispensed through the water dispense part 20.

The control device 100 may control an operation of the water purifier 100.

The control device 100 may be the control device 100 described above.

The hot water tank 200 may be a flow rate tank in which purified water which has passed through a filter installed within the water purifier 1000 is stored, heated and dispensed as hot water The hot water tank 200 may be the hot water tank 200 described above.

The heating unit 300 may be a heating device heating the hot water tank 200 to heat hot water dispensed from the hot water tank 200.

The heating unit 300 may be the heating unit 300 described above.

That is, the heating unit 300 may be an induction heater.

The water purifier 1000 may further include one or more of a flow rate valve 400 controlling a flow channel through which purified water is introduced to the hot water tank 200, a hot water dispense valve 500 controlling a flow channel through which hot water is externally dispensed from the hot water tank 200, a steam valve 600 controlling a flow channel through which steam, which is generated in the hot tank 200 and in a flow channel through which hot water is dispensed, is discharged to the outside, and a flow rate sensor 700 sensing a flow rate of introduced water.

The control device 100 may control the hot water tank 200, the heating unit 300, the flow rate valve 400, the hot water dispense valve 500, the steam valve 600, and the flow rate sensor 700 such that the water purifier dispenses hot water.

The control device 100 may control ON/OFF of the flow rate valve 400, and control a flow rate of water introduced to the hot water tank 200 through the inlet part 10.

For example, the control device 100 may control a rate and a flow rate of a liquid introduced to the hot water tank 200 by adjusting an angle of the flow rate valve 400.

The control device 100 may control a flow rate of hot water dispensed through the water dispense part 20 from the hot water tank 200 by controlling ON/OFF of the hot water dispense valve 500.

For example, the control device 100 may control a rate and a flow rate of hot water dispensed through the water dispense part 20 from the hot water tank 200 by controlling an angle of the hot water dispense valve 500.

The controller 100 may perform control such that steam generated in the hot water tank 200 and in a flow channel through which hot water is dispensed is discharged to the outside, by controlling ON/OFF of the steam valve 600.

The control device 100 may sense water introduced from the inlet part 10 to the hot water tank 200 through the flow rate sensor 700, and control power output of the heating unit 300 or a flow rate of water introduced to the hot water tank 200 on the basis of the sensed flow rate of water.

The water purifier 1000 may further include a purified water dispense valve 800 controlling a flow channel through which purified water is dispensed to the outside and a cold water dispense valve 900 controlling a flow channel through which cold water is dispensed to the outside. Although not shown, the water purifier 1000 may further include a filtering unit filtering purified water or cold water, a cooling unit cooling cold water, and a component associated with dispense of the purified water or cold water.

The control device 100 may include an input unit 110 for receiving a command signal regarding an operation of the water purifier 1000 and a controller 120 controlling an operation of the water purifier 1000 on the basis of the command signal.

The control device 100 may further include one or more of a storage unit 130 storing data process in the controller 120 or regarding an operation of the water purifier 1000, a sensing unit 140 sensing one or more state values of the water purifier 1000 through one or more sensors provided in the water purifier 1000, and a communication unit 150 communicating with an external device.

The storage unit 130, the sensing unit 140, and the communication unit 150 are components assisting a control operation of the controller 120, and the control device 100 may further include any other component related to a control operation of the controller 120 in addition to the aforementioned components or a component similar thereto.

In the water purifier 1000, the controller 120 may control power output of the heating unit 300 on the basis of the command signal regarding a set temperature of dispensed hot water input to the input unit 110, to control a temperature of dispensed hot water.

The command signal may be a command regarding a set temperature of the dispensed hot water.

The set temperature may be any one of 85° C., 75° C., and 40° C.

In the water purifier 1000, the controller 120 may control power output of the heating unit 300 by controlling AC power applied to the heating unit 300.

In the water purifier 1000, the controller 120 may variably control power output of the heating unit 300 based on a set temperature of the dispensed hot water input by the command signal.

In the water purifier 1000, the controller 120 may variably control power output of the heating unit 300 by variably controlling a frequency or a phase of AC power applied to the heating unit 300.

In the water purifier 1000, the controller 120 may detect power output of the heating unit 300 based on the set temperature and compare the detected output with a preset output reference to correct the power output of the heating unit 300 based on the comparison result.

The preset output reference may refer to an error range reference with respect to power output of the heating unit 300 in accordance with the set temperature.

In the water purifier 1000, when the detected output exceeds or falls short of the preset output reference, the controller 120 may correct power output of the heating unit 300 to be within the preset output reference.

In the water purifier 1000, when the power output of the heating unit 300 is controlled to be corrected, the controller 120 may store the corrected value in the storage unit 130.

The corrected value stored in the storage unit 130 may be used as a basis for the controller 120 to correct power output of the heating unit later.

In the water purifier 1000, when the set temperature is changed from a high temperature to a low temperature within a preset time reference, the controller 120 may stop the power output of the heating unit 300.

The preset reference time may refer to a time reference during which a temperature of the hot water tank 200 is maintained at a high temperature in cases where the set temperature is changed from a high temperature to a low temperature. The preset time reference may be 3 minutes, for example.

In the water purifier 1000, when the set temperature is changed from the high temperature to a low temperature after the lapse of the preset time reference, the controller 120 may control power output of the heating unit 300 based on a result of detection of a temperature of the hot water tank 200.

In the water purifier 1000, the controller 120 may detect the flow rate of introduced water and the flow rate of dispensed water through the flow rate sensor 700 and the flow rate detection unit detecting a flow rate of water dispensed from the hot water tank 200.

In the water purifier 1000, the controller 120 may detect a flow rate of water introduced to the hot water tank 200 and a flow rate of water dispensed from the hot water tank 200, and compare the detected flow rate of introduced water and the detected flow rate of dispensed water to variably control power output of the heating unit 300 based on the comparison result.

In the water purifier 1000, when comparing the flow rate of introduced water and the flow rate of dispensed water, the controller 120 may compare the flow rate of introduced water with the product of the flow rate of dispensed water and a preset reference rate.

The preset reference rate is an appropriate rate reference of the flow rate of dispensed water with respect to the flow rate of introduced water, and may be 75%, for example.

In the water purifier 1000, when the flow rate of introduced water falls short of the flow rate of dispensed water based on the comparison result, the controller 120 may reduce power output of the heating unit 300 by the insufficient ratio.

In the water purifier 1000, the controller 120 may variably control power output of the heating unit 300 based on a temperature of dispensed hot water.

In the water purifier 1000, the controller 120 may detect a temperature of dispensed hot water through a detection unit detecting a temperature of hot water dispensed from the hot water tank 200.

In the water purifier 1000, the controller 120 may detect a temperature of hot water dispensed from the hot water tank 200 and compare the detected temperature with a preset first temperature reference to variably control power output of the heating unit 300 based on the comparison result.

The first temperature reference may refer to a maximum allowable temperature reference of hot water dispensed from the water purifier 1000 and may be 95° C., for example.

In the water purifier 1000, when the detected temperature exceeds the first temperature reference based on the comparison result, the controller 120 may reduce power output of the heating unit 300 at a predetermined time interval until a temperature of the dispensed hot water is reduced to the first temperature reference.

In the water purifier 1000, when the detected temperature exceeds the first temperature reference based on the detection result, the controller 120 may reduce power output of the heating unit 300 at a predetermined time interval based on a temperature of the dispensed hot water.

In the water purifier 1000, the controller 120 may variably control power output of the heating unit based on an internal temperature of the water purifier 1000.

Here, an internal temperature of the water purifier 1000 may refer to a temperature of the control device 100 or the hot water tank 200.

In the water purifier 1000, the controller 120 may detect a temperature of the control device 100 and compare the detected temperature with a preset second temperature reference. When the detected temperature exceeds the second temperature reference based on a comparison result, the controller 120 may stop the power output of the heating unit 300.

The second temperature reference may refer to a maximum allowable reference temperature at which the control device 100 normally operates.

In the water purifier 1000, when the detected temperature exceeds the second temperature reference, the controller may stop the power output of the heating unit 300 to reduce a temperature of the control device 100.

In the water purifier 1000, the controller 120 may also detect a temperature of the hot water tank 200 and compare the detected temperature with a preset third temperature reference. When the detected temperature exceeds the third temperature reference based on the comparison result, the controller 120 may stop the power output of the heating unit 300.

In the water purifier 1000, the controller 102 may detect a temperature of the hot water tank 200 through a temperature detection unit detecting a temperature of the hot water tank 200.

The third temperature reference may refer to a maximum allowable reference temperature at which the hot water tank 200 normally operates.

In the water purifier 1000, when the detected temperature exceeds the third temperature reference, the controller 120 may stop the power output of the heating unit 300 to reduce a temperature of the hot water tank 200.

As described above, the water purifier 1000 may include a flow rate valve 400 adjusting a flow rate of water introduced to the hot water tank 200 as described above, and the controller 120 may adjust an angle of the flow rate valve 400 based on a flow rate of water introduced to the hot water tank 200 in an environment in which the water purifier 1000 is installed or an amount of water stored in the hot water tank 200.

In the water purifier 1000, when the water purifier 1000 is initially installed, the controller 120 may detect a flow rate of water introduced to the hot water tank 200, calculate an angle of the flow rate valve 400 and an appropriate control value on the basis of the detected flow rate of introduced water, set an initial angle of the flow rate valve 400 on the basis of the calculated angle and appropriate control value, and adjust an angle of the flow rate valve 400.

In the water purifier 1000, when the water purifier 1000 is initially installed, the controller 120 may store the calculated angle and appropriate control value in the storage unit 130.

The calculated angle and appropriate control value stored in the storage unit 130 may be used as a basis for the controller 120 to set and control an angle of the flow rate valve 400, when the water purifier 1000 is re-installed or re-set later.

In the water purifier 1000, after hot water is first dispensed from the hot water tank 200, the controller 120 may control a flow rate of water introduced to the hot water tank 200 and power output of the heating unit 300 based on a difference between a temperature of water introduced to the hot water tank 200 and a temperature of hot water dispensed from the hot water tank 200.

In the water purifier 1000, In cases where hot water is secondly dispensed with the lapse of a predetermined time after hot water is first dispensed from the hot water tank, if a difference between a temperature of water introduced to the hot water tank and a temperature of hot water dispensed from the hot water tank is smaller than a preset difference reference, the controller 120 may control a flow rate of water introduced to the hot water and power output of the heating unit 300 by stages.

In the water purifier 1000, as illustrated in FIG. 4, after the predetermined period of time has lapsed, when a difference between a temperature of water introduced to the hot water tank 200 and a temperature of hot water dispensed from the hot water tank 200 is smaller than a preset difference reference, the controller 120 may determine that the secondly dispensed water is for the first cup and control a flow rate of water introduced to the hot water tank 200 and power output of the heating unit 300 by stages.

In the water purifier 1000, as illustrated in FIG. 4, before the predetermined period of time does not lapse yet or after the predetermined period of time has lapsed, if the difference between a temperature of water introduced to the hot water tank 200 and a temperature of hot water dispensed from the hot water tank 200 exceeds the preset difference reference, the controller 120 may determine that the secondly dispensed water is for a successive cup (repeated cup), and control the power output of the heating unit 300 continuously.

When the secondly dispensed water is water for the cup and a temperature of water introduced to the hot water tank 200 is equal to or higher than a preset water temperature reference, the controller 120 may control the flow rate of water to be introduced by stages and sets a preheating time for power output of the heating unit 300 based on a temperature of introduced water and a preheating time may be set for power output of the heating unit 300 to perform control.

As illustrated in FIG. 5, in the water purifier 1000, when it is determined that the secondly dispensed water is for the first cup and a temperature of water introduced to the hot water tank 200 is equal to or greater than a preset water temperature reference, the controller 120 may control power output of the heating unit 300 based on the set temperature to preheat the hot water tank 200 while water is being introduced, and here, the controller may set the preheat time based on a temperature of introduced water to preheat the hot water tank 200 by the preheat time, and the controller 120 may control introduced water by stages such that, in a first stage, water is introduced at a predetermined slope up to a target flow rate of water, and thereafter, in a second stage, the target flow rate of water is lowered and water is introduced slowly.

In the water purifier 1000, also, when it is determined that the secondly dispensed water is for the successive cup (repeated cup) and a temperature of water introduced to the hot water tank 200 is equal to or higher than the preset water temperature reference, the controller 120 may set and control a preheat time in the power output of the heating unit 300 based on a temperature of the introduced water.

When it is determined that the secondly dispensed water is for the first cup or the successive cup (repeated cup), the preheat time may be set as illustrated in FIGS. 6 and 7, for example.

FIGS. 9 to 14 illustrate example control methods by a control device of a water purifier.

The control method 1 may be a control method of a control device provided in a water purifier dispensing cold water or hot water.

The control method 1 may be a control method of a control device provided in a water purifier heating hot water through induction heating.

The control method 1 may be a control method of heating hot water by a control device provided in a water purifier through induction heating.

The control method may also be a control method of the control device described above.

The control method 1 may be a control method controlling a temperature of dispensed hot water by a control device provided in a water purifier.

Figure 9:
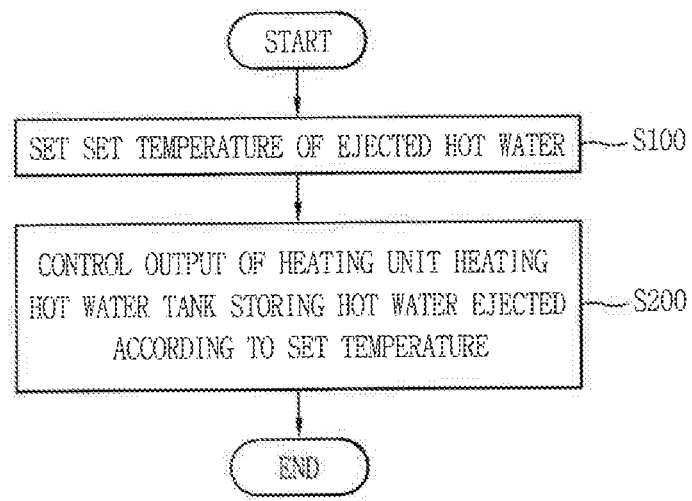
FIGS. 9 to 14 are flowcharts illustrating example control methods by a control device of a water purifier.

As illustrated in FIG. 9, the control method 1 includes a step S100 of setting a set temperature of dispensed hot water; and a step S200 of controlling output of a heating unit heating hot water tank storing the dispensed hot water based on the set temperature.

That is, in the control method 1, a temperature of the dispensed hot water may be controlled by controlling power output of the heating unit.

The set temperature may refer to a temperature of hot water dispensed from the water purifier, and may be any one of 85° C., 75° C., and 40° C.

Setting of the set temperature may be performed by an input operation of a user of the water purifier.

The hot water tank may be a flow rate tank storing purified water of the water purifier, and here, the purified water may be heated and subsequently dispensed.

The heating unit may be a heating device heating the hot water tank to heat hot water dispensed from the hot water tank.

The heating unit may be an induction heater.

The induction heater may refer to an induction heater heating a metal body in contact therewith by generating Joule heat through an induced current generated by a magnetic field when a high frequency AC current is applied thereto.

Here, the metal body in contact with the heating unit may be the hot water tank 200.

That is, in the control method 1, a temperature of dispensed hot water may be controlled by heating the hot water tank through the induction heater.

The heating unit may heat the hot water tank based on.

In step S200 of controlling power output of the heating unit, power output of the heating unit may be variably controlled.

In the step S200 of controlling power output of the heating unit, power output of the heating unit may be variably controlled by variably controlling a frequency or a phase of AC power applied to the heating unit.

In the step S200 of controlling power output of the heating unit, power output of the heating unit 300 may be variably controlled such that power output of the heating unit 300 is decreased or increased over time.

An example of such controlling is illustrated in FIGS. 2A to 2C.

Figure 10:
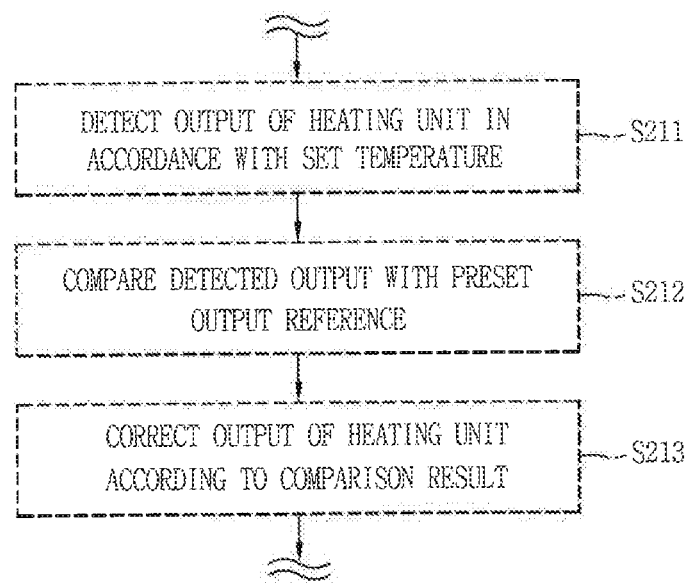

FIG. 10 illustrates an example method of controlling a control device of a water purifier.

As illustrated in FIG. 10, the step S200 of controlling power output of the heating unit may include a step S211 of detecting power output of the heating unit based on the set temperature, a step S212 of comparing the detected output with a preset output reference, and a step S213 of correcting power output of the heating unit based on the comparison result.

The preset output reference may refer to an error range reference with respect to power output of the heating unit in accordance with the set temperature.

In the step S211 of detecting power output of the heating unit based on the set temperature, after power output of the heating unit is controlled based on the set temperature, power output of the heating unit may be detected.

In the step S212 of comparing the detected output with a preset output reference, the output detected in the step S211 of detecting power output of the heating unit may be compared with the preset output reference.

In the step S213 of correcting the power output of the heating unit, when the detected output exceeds or does not reach the preset output reference based on a result of comparing the output detected in the step S212 of comparing the detected output with a preset output reference with the preset output reference, the power output of the heating unit may be corrected such that the power output of the heating unit is within the preset output reference.

That is, as illustrated in FIG. 10, in the step S200 of controlling power output of the heating unit, the power output of the heating unit in accordance with the set temperature may be feedback-controlled.

In the step S200 of controlling power output of the heating unit, when the set temperature is changed from a high temperature to a low temperature within a preset time reference, the power output of the heating unit 300 may be stopped.

The preset reference time may refer to a time reference during which a temperature of the hot water tank 200 is maintained at a high temperature when the set temperature is changed from a high temperature to a low temperature. The preset time reference may be 3 minutes, for example.

The case in which the set temperature is changed from a high temperature to a low temperature within the preset time reference may be a case in which the set temperature is changed from 85° C. to 40° C. within 3 minutes, the preset time reference.

In the step S200 of controlling power output of the heating unit, when the set temperature is changed from the high temperature to a low temperature after the lapse of the preset time reference, the power output of the heating unit may be controlled based on a result of detection of a temperature of the hot water tank.

Figure 11:
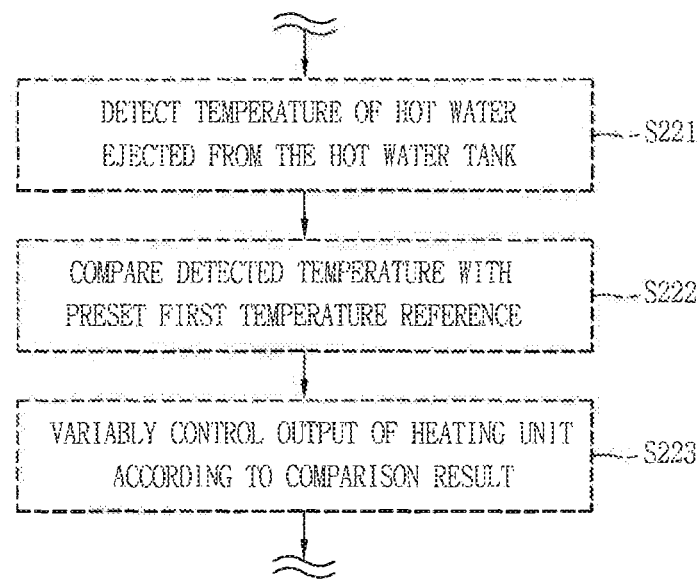

FIG. 11 illustrates another example method of controlling a control device of a water purifier. As illustrated in FIG. 11, the step S200 of controlling power output of the heating unit may include a step S221 of detecting a temperature of hot water dispensed from the hot water tank, a step S222 of comparing the detected temperature with a preset first temperature reference, and a step S223 of variably controlling power output of the heating unit based on the comparison result.

The first temperature reference may refer to a maximum allowable temperature reference of hot water dispensed from the water purifier 1000 and may be 95° C., for example.

In the step S221 of detecting a temperature of hot water dispensed from the hot water tank, a temperature of dispensed hot water may be detected through a detection unit of detecting a temperature of hot water dispensed from the hot water tank.

In the step S222 of comparing the detected temperature with the preset first temperature reference, the temperature detected in step S221 of detecting a temperature of hot water dispensed from the hot water tank may be compared with the first temperature reference.

In the step S223 of variably controlling power output of the heating unit based on the comparison result, when the detected temperature exceeds the first temperature reference based on a result of comparing the temperature detected in the step S222 with the first temperature reference, power output of the heating unit may be reduced at a predetermined time interval until a temperature of dispensed hot water is reduced to the first temperature reference.

In the step S223 of variably controlling power output of the heating unit based on the comparison result, when the detected temperature exceeds the first temperature reference, the power output of the heating unit may be reduced at a predetermined time interval based on a temperature of the dispensed hot water.

For example, when a temperature of the dispensed hot water is lower than 97 or 98° C., power output of the heating unit 300 may be reduced by 30 W per second. When temperature of the dispensed hot water is lower than 98 or 99° C., power output of the heating unit 300 may be reduced by 50 W per second. When a temperature of the dispensed hot water exceeds 99° C., power output of the heating unit 300 may be reduced by 100 W per second.

Figure 12:
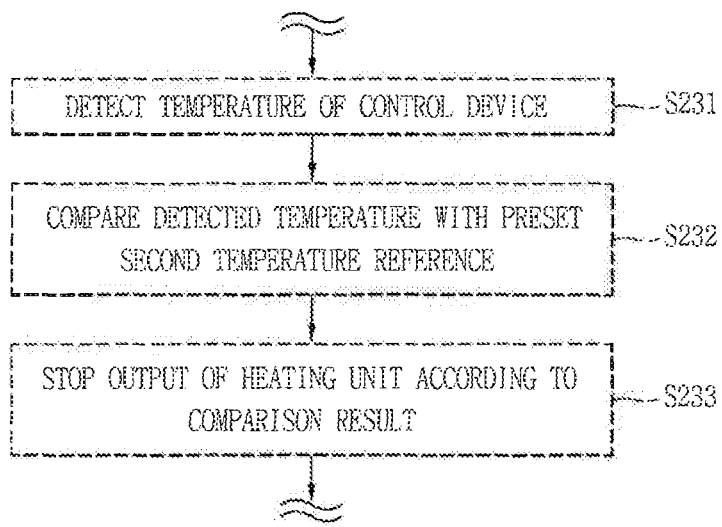

FIG. 12 illustrates another example method of controlling a control device of a water purifier. As illustrated in FIG. 12, the step S200 of controlling power output of the heating unit may include a step S231 of detecting a temperature of the control device, a step S232 of comparing the detected temperature with a preset second temperature reference, and a step S233 of stopping the power output of the heating unit based on the comparison result.

The second temperature reference may refer to a maximum allowable reference temperature at which the control device normally operates.

In the step S231 of detecting a temperature of the control device, a temperature of the control device may be detected through a temperature detection unit included in the control device.

In the step S232 of comparing the detected temperature with a preset second temperature reference, the temperature of the control device detected in step S231 may be compared with the second temperature reference.

The step S233 of stopping the power output of the heating unit based on the comparison result, when the detected temperature exceeds the second temperature reference based on the result of comparison result in step S232, power output of the heating unit may be stopped.

That is, in the step S233 of stopping the power output of the heating unit based on the comparison result, a temperature of the control device may be reduced.

Figure 13:
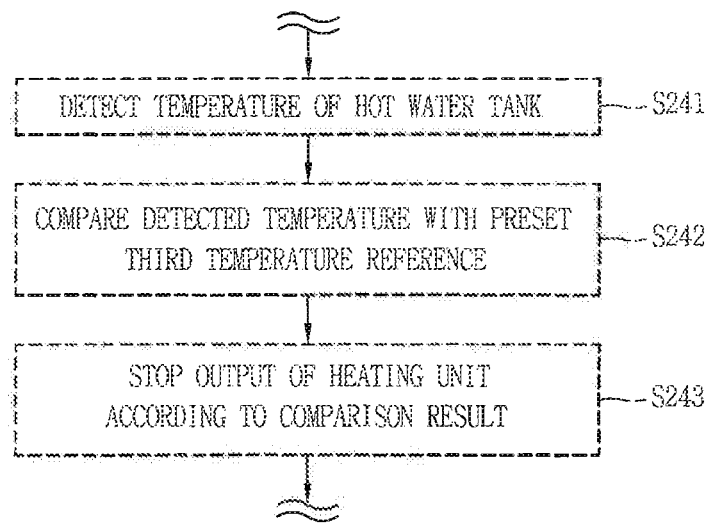

FIG. 13 illustrates another example method of controlling a control device of a water purifier. As illustrated in FIG. 13, the step S200 of controlling power output of the heating unit may include a step S241 of detecting a temperature of the hot water tank, a step S242 of comparing the detected temperature with a preset third temperature reference, and a step S243 of stopping the power output of the heating unit based on the comparison result.

The third temperature reference may refer to a maximum allowable reference temperature at which the hot water tank 200 normally operates.

In the step S241 of detecting a temperature of the hot water tank, a temperature of the hot water tank may be detected through a temperature detection unit of detecting a temperature of the hot water tank.

In the step S241 of detecting a temperature of the hot water tank, a temperature of the hot water tank may be detected through a temperature detection unit of detecting a temperature of the hot water tank.

In the step S242 of comparing the detected temperature with a preset third temperature reference, the temperature of the hot water tank detected in the step S241 may be compared with the third temperature reference.

In the step S243 of stopping the power output of the heating unit based on the comparison result, when the detected temperature exceeds the third temperature reference based on the comparison result in step S242, the power output of the heating unit may be stopped.

That is, in the step S243 of stopping the power output of the heating unit based on the comparison result, the power output of the heating unit may be stopped to reduce a temperature of the hot water tank.

Figure 14:
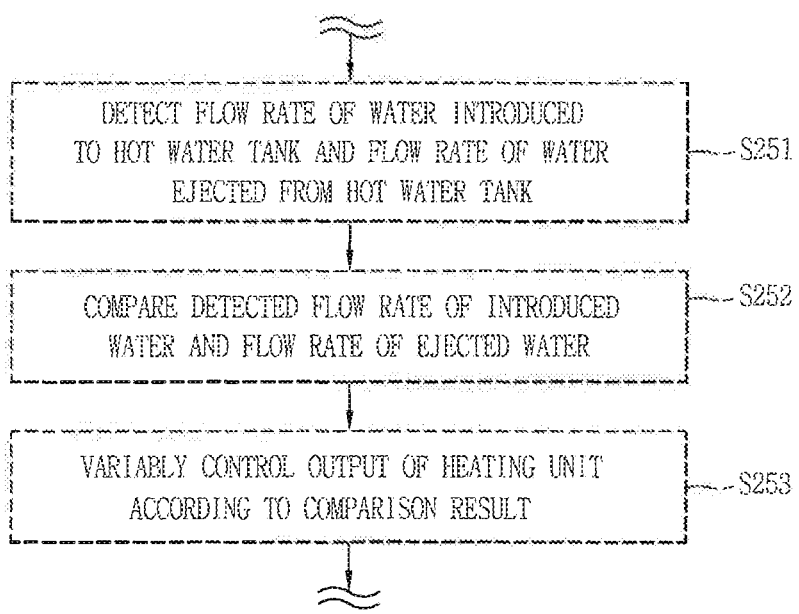

FIG. 14 illustrates another example method of controlling a control device of a water purifier. As illustrated in FIG. 14, the step S200 of controlling power output of the heating unit may include: a step S251 of detecting a flow rate of water introduced to the hot water tank and a flow rate of water dispensed from the hot water tank, a step S252 of comparing the detected flow rate of introduced water and the detected flow rate of dispensed water, and a step S253 of variably controlling power output of the heating unit.

In the step S251 of detecting a flow rate of water introduced to the hot water tank and a flow rate of water dispensed from the hot water tank, a flow rate of introduced water and a flow rate of dispensed water may be detected through a flow rate detection unit detecting a flow rate of water introduced to the hot water tank and a flow rate detection unit detecting a flow rate of water dispensed from the hot water tank.

The step S252 of comparing the detected flow rate of introduced water and the detected flow rate of dispensed water, the flow rate of introduced water and the flow rate of dispensed water detected in step S251 may be compared.

In the step S252 of comparing the detected flow rate of introduced water and the detected flow rate of dispensed water, the flow rate of introduced water may be compared with the product of the flow rate of dispensed water and a preset reference rate.

The preset reference rate is an appropriate rate reference of the flow rate of dispensed water with respect to the flow rate of introduced water, and may be 75%, for example.

In the step S253 of variably controlling the power output of the heating unit based on the comparison result, when the flow rate of introduced water falls short of the flow rate of dispensed water based on the comparison result in the step S252, power output of the heating unit 300 may be reduced by the insufficient ratio.

In the step S253 of variably controlling power output of the heating unit based on the comparison result, when the flow rate of introduced water does not reach 75% of the flow rate of dispensed water based on the result of comparison between the flow rate of introduced water and the product of the flow rate of dispensed water and the preset reference rate, the power output of the heating unit 300 may be reduced by an insufficient ratio with respect to 75% of the flow rate of dispensed water.

That is, in the step S253 of variably controlling the power output of the heating unit based on the comparison result, heating of the hot water tank may be reduced by the reduced amount of water stored in the hot water tank.

In the step S200 of controlling the power output of the heating unit, after hot water is first dispensed from the hot water tank, a flow rate of water introduced to the hot water tank and power output of the heating unit may be controlled based on a difference between a temperature of the water introduced to the hot water tank and a temperature of hot water dispensed from the hot water tank.

In some implementations, where hot water is firstly dispensed, it may mean that hot water is previously dispensed from the water purifier.

In the step S200 of controlling power output of the heating unit, in cases where hot water is secondly dispensed with the lapse of a predetermined time after hot water is first dispensed from the hot water tank, if a difference between a temperature of water introduced to the hot water tank and a temperature of hot water dispensed from the hot water tank is smaller than a preset difference reference, a flow rate of water introduced to the hot water and power output of the heating unit 300 may be controlled by stages.

The predetermined period of time may refer to a time reference for determining whether secondly dispensed hot water after hot water is first dispensed is for a first cup or a successive cup (repeated cup), and may be 3 minutes, for example.

The preset difference reference may refer to a temperature reference for determining whether secondly dispensed hot water after hot water is first dispensed is for a first cup or a successive cup (repeated cup), and may be 5° C., for example.

As illustrated in FIG. 4, in the step S200 of controlling power output of the heating unit, after the predetermined period of time has lapsed, when a difference between a temperature of water introduced to the hot water tank and a temperature of hot water dispensed from the hot water tank is smaller than a preset difference reference, it may be determined that the secondly dispensed water is for the first cup and a flow rate of water introduced to the hot water tank and power output of the heating unit may be controlled by stages.

In the step S200 of controlling power output of the heating unit, when it is determined that the secondly dispensed water is for the first cup, a flow rate of water introduced to the hot water tank and power output of the heating unit may be controlled by stages based on a temperature of the water introduced to the hot water tank.

In the step S200 of controlling power output of the heating unit, when the secondly dispensed water is water for the first cup and a temperature of water introduced to the hot water tank is equal to or higher than a preset water temperature reference, water is controlled to be introduced by stages and a preheating time may be set for the power output of the heating unit based on a temperature of introduced water and controlled.

The preset water temperature reference is a temperature reference for determining whether the preheating time is required, and may be 12.5° C.

The preheating time may refer to a heating time for preventing a decrease in temperature of the hot water tank due to introduction of water, while water is being introduced.

In the step S200 of controlling power output of the heating unit, as illustrated in FIG. 5, when it is determined that the secondly dispensed water is for the first cup and a temperature of water introduced to the hot water tank is equal to or greater than a preset water temperature reference, power output of the heating unit may be controlled based on the set temperature to preheat the hot water tank while water is being introduced, and here, the preheat time may be set based on a temperature of introduced water to preheat the hot water tank by the preheat time, and introduced water may be controlled by stages such that, in a first stage, water is introduced at a predetermined slope up to a target flow rate of water, and thereafter, in a second stage, the target flow rate of water is lowered and water is introduced slowly.

Also, as illustrated in FIG. 4, in step S200 of controlling power output of the heating unit, before the predetermined period of time does not lapse yet or after the predetermined period of time has lapsed, if the difference between a temperature of water introduced to the hot water tank and a temperature of hot water dispensed from the hot water tank exceeds the preset difference reference, it may be determined that the secondly dispensed water is for a successive cup (repeated cup), and the power output of the heating unit 300 may be controlled continuously.

Also, in step S200 of controlling power output of the heating unit, when it is determined that the secondly dispensed water is for the successive cup (repeated cup) and a temperature of water introduced to the hot water tank 200 is equal to or higher than the preset water temperature reference, a preheat time may be set for the power output of the heating unit based on a temperature of the introduced water and controlled.

When it is determined that the secondly dispensed water is for the first cup or the successive cup (repeated cup), the preheat time may be set as illustrated in FIGS. 6 and 7, for example.

Figure 15:
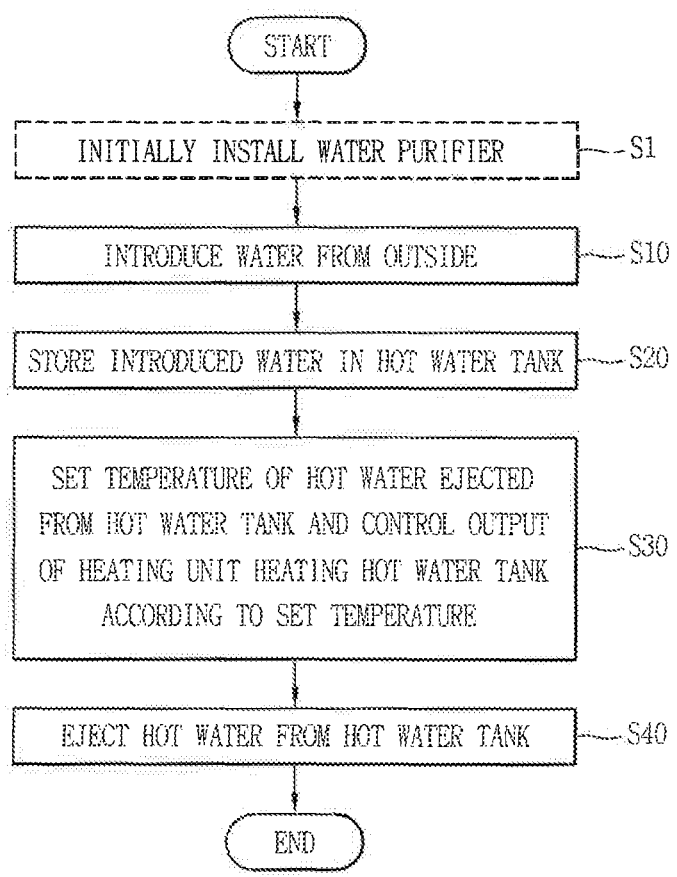
FIGS. 15 and 16 are flow charts illustrating example methods of controlling a water purifier.
Figure 16:
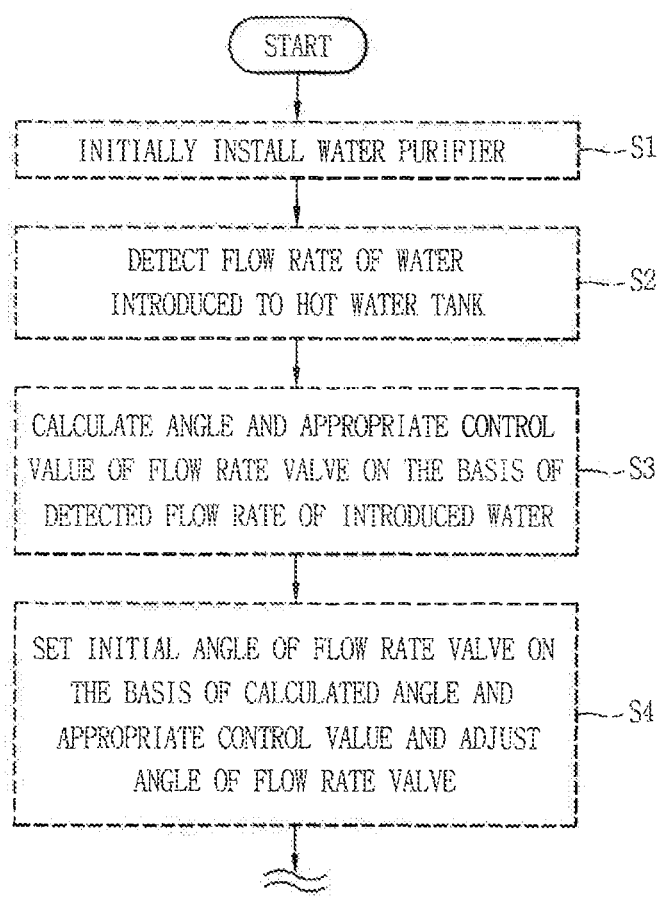

FIGS. 15 and 16 illustrate example methods of controlling a water purifier.

With reference to FIGS. 15 and 16, the control method 2 may be a control method of a water purifier dispensing cold water or hot water.

The control method 2 may be a control method of a water purifier heating hot water through induction heating.

The control method 2 may be a control method of heating hot water by a water purifier through induction heating.

The control method may also be a control method of the water purifier described above.

The control method 2 may also be a control method of the control device of the water purifier described above.

The control method 2 may be a control method of controlling a temperature of dispensed hot water of a water purifier.

The control method 2 may be a control method including the control method 1 described above.

The control method 2 can be the same as the control method 1 described above and can have the following differences. The control method 2 can have other differences not described below.

As illustrated in FIG. 15, the control method 2 includes a step S10 of receiving water from the outside, a step S20 of storing the introduced water in a hot water tank, a step S30 of setting a set temperature of hot water dispensed from the hot water tank and controlling power output of the heating unit heating the hot water tank based on a set temperature, and a step S40 of dispensing hot water stored in the hot water tank.

In the step S10 of receiving water from the outside, water may be introduced to the water purifier from the outside.

In the step S20 of storing the introduced water in the hot water tank, water introduced in step S10 may be stored in the hot water tank.

In step S30 of controlling power output of the heating unit heating the hot water tank based on a set temperature, hot water stored in the hot water tank may be heated by controlling power output of the heating unit.

The step S30 of controlling power output of the heating unit heating the hot water tank based on the set temperature may be the control method 1.

That is, the step S30 of controlling power output of the heating unit heating the hot water tank based on the set temperature may include step S100 of setting a set temperature of dispensed hot water in the control method 1 described above and step S200 of controlling power output of the heating unit heating the hot water tank storing hot water dispensed based on the set temperature.

In step S30 of controlling power output of the heating unit heating the hot water tank based on the set temperature, the hot water tank may be heated by controlling power output of the heating unit based on the set temperature.

In the step S30 of controlling power output of the heating unit heating the hot water tank based on the set temperature, power output of the heating unit may be variably controlled.

In step S30 of controlling power output of the heating unit heating the hot water tank based on the set temperature, power output of the heating unit may be variably controlled by variably controlling a frequency or a phase of AC power applied to the heating unit.

In step S30 of controlling power output of the heating unit heating the hot water tank based on the set temperature, power output of the heating unit may be variably controlled to be decreased or increased over time.

The step S30 of controlling power output of the heating unit heating the hot water tank based on the set temperature may include the steps S211-S213 illustrated in FIG. 10. That is, the step S30 can include a step S211 of detecting power output of the heating unit based on the set temperature, a step S212 of comparing the detected output with a preset output reference, and a step S213 of correcting power output of the heating unit based on a comparison result.

The preset output reference may refer to an error range reference regarding power output of the heating unit based on the set temperature.

In the step S213 of correcting power output of the heating unit, when the detected output exceeds or does not reach the preset output reference based on a result of comparing the detected output and the preset output reference in step S212, the power output of the heating unit may be corrected to be within the preset output reference.

In step S30 of controlling power output of the heating unit heating the hot water tank based on the set temperature, when the set temperature is changed from a high temperature to a low temperature, the power output of the heating unit may be stopped.

The preset reference time may refer to a time reference during which a temperature of the hot water tank 200 is maintained at a high temperature when the set temperature is changed from a high temperature to a low temperature. The preset time reference may be 3 minutes, for example.

In step S30 of controlling power output of the heating unit heating the hot water tank based on the set temperature, when the set temperature is changed from a high temperature to a low temperature after the lapse of a preset period of time, the power output of the heating unit may be controlled based on a result of detecting a temperature of the hot water tank.

Also, as illustrated in FIG. 11, the step S30 of controlling power output of the heating unit heating the hot water tank based on the set temperature may include a step S221 of detecting a temperature of hot water dispensed from the hot water tank, a step S222 of comparing the detected temperature with a preset first temperature reference, and a step S223 of variably controlling power output of the heating unit based on a comparison result.

The first temperature reference may refer to a maximum allowable temperature reference of hot water dispensed from the water purifier 1000 and may be 95° C., for example.

In the step S223 of variably controlling an power output of the heating unit based on a comparison result, when the detected temperature exceeds the first temperature reference based on the comparison result in the step S222 in which the detected temperature is compared with the preset first temperature reference, power output of the heating unit may be reduced at a predetermined time interval until the temperature of the dispensed hot water is reduced to the first temperature reference.

In the step S223 of variably controlling power output of the heating unit based on a comparison result, when the detected temperature exceeds the first temperature reference based on the detection result, power output of the heating unit may be reduced at a predetermined time interval based on a temperature of the dispensed hot water.

As illustrated in FIG. 12, the step S30 of controlling power output of the heating unit heating the hot water tank based on a set temperature may include a step S231 of detecting a temperature of the control device, a step S232 of comparing the detected temperature with a preset second temperature reference, and a step S233 of stopping the power output of the heating unit based on a comparison result.

The second temperature reference may refer to a maximum allowable reference temperature at which the control device 100 normally operates.

In the step S233 of stopping the power output of the heating unit based on a comparison result, when the detected temperature exceeds the second temperature reference based on the result of comparing the detected temperature with the second temperature reference in the step S232 in which the detected temperature is compared with the preset second temperature reference, the power output of the heating unit may be stopped.

Also, as illustrated in FIG. 13, the step S30 of controlling power output of the heating unit heating the hot water tank based on a set temperature may include a step S241 of detecting a temperature of the hot water tank, a step S242 of comparing the detected temperature with a preset third temperature reference, and a step S243 of stopping the power output of the heating unit based on a comparison result.

The third temperature reference may refer to a maximum allowable reference temperature at which the hot water tank 200 normally operates.

In the step S243 of stopping the power output of the heating unit based on a comparison result, when the detected temperature exceeds the third temperature reference based on a result of comparing the temperature detected in the step S242 in which the detected temperature is compared with the preset third temperature reference, with the third temperature reference, the power output of the heating unit may be stopped.

Also, as illustrated in FIG. 14, the step S30 of controlling power output of the heating unit heating the hot water tank based on a set temperature may include a step S251 of detecting a flow rate of water introduced to the hot water tank and a flow rate of water dispensed from the hot water tank, a step S252 of comparing the detected flow rate of introduced water and the detected flow rate of dispensed water, and a step S253 of variably controlling power output of the heating unit based on a comparison result.

In the step S252 of comparing the detected flow rate of introduced water and the detected flow rate of dispensed water, the flow rate of introduced water and the flow rate of dispensed water detected in the step S251 of detecting a flow rate of water introduced to the hot water tank and a flow rate of water dispensed from the hot water tank may be compared.

In the step S252 of comparing the detected flow rate of introduced water and the detected flow rate of dispensed water, the flow rate of introduced water may be compared with the flow rate of dispensed water, and here, the flow rate of introduced water may be compared with the product of the flow rate of dispensed water and a preset reference rate.

The preset reference rate is an appropriate rate reference of the flow rate of dispensed water with respect to the flow rate of introduced water, and may be 75%, for example.

The step S253 of variably controlling power output of the heating unit based on a comparison result, when the flow rate of introduced water falls short of the flow rate of dispensed water based on the comparison result in the step S252 of comparing the detected flow rate of introduced water and the detected flow rate of dispensed water, the power output of the heating unit 300 may be reduced by the insufficient ratio.

In the step S253 of variably controlling power output of the heating unit based on a comparison result, when the flow rate of introduced water does not reach 75% of the flow rate of dispensed water based on the result of comparison between the flow rate of introduced water and the product of the flow rate of dispensed water and the preset reference rate, the controller 120 may reduce the power output of the heating unit 300 by an insufficient ratio with respect to 75% of the flow rate of dispensed water.

In step S30 of controlling power output of the heating unit heating the hot water tank based on a set temperature, after hot water is first dispensed from the hot water tank, a flow rate of water introduced to the hot water tank and power output of the heating unit may be controlled based on a difference between a temperature of the water introduced to the hot water thank and a temperature of hot water dispensed from the hot water tank.

in some implementations, where hot water is firstly dispensed, it may mean that hot water is previously dispensed from the water purifier.

In step S30 of controlling power output of the heating unit heating the hot water tank based on a set temperature, in cases where hot water is secondly dispensed with the lapse of a predetermined time after hot water is first dispensed from the hot water tank, if a difference between a temperature of water introduced to the hot water tank and a temperature of hot water dispensed from the hot water tank is smaller than a preset difference reference, a flow rate of water introduced to the hot water and power output of the heating unit 300 may be controlled by stages.

The predetermined period of time may refer to a time reference for determining whether secondly dispensed hot water after hot water is first dispensed is for a first cup or a successive cup (repeated cup), and may be 3 minutes, for example.

The preset difference reference may refer to a temperature reference for determining whether secondly dispensed hot water after hot water is first dispensed is for a first cup or a successive cup (repeated cup), and may be 5° C., for example.

In step S30 of controlling power output of the heating unit heating the hot water tank based on a set temperature, after the predetermined period of time has lapsed, when a difference between a temperature of water introduced to the hot water tank and a temperature of hot water dispensed from the hot water tank is smaller than a preset difference reference, it may be determined that the secondly dispensed water is for the first cup and a flow rate of water introduced to the hot water tank and power output of the heating unit may be controlled by stages.

In step S30 of controlling power output of the heating unit heating the hot water tank based on a set temperature, when the secondly dispensed water is water for the first cup and a temperature of water introduced to the hot water tank is equal to or higher than a preset water temperature reference, water is controlled to be introduced by stages and a preheating time may be set for the power output of the heating unit based on a temperature of introduced water and controlled.

The preset water temperature reference is a temperature reference for determining whether the preheating time is required, and may be 12.5° C.

The preheating time may refer to a heating time for preventing a decrease in temperature of the hot water tank due to introduction of water, while water is being introduced.

Also, in step S30 of controlling power output of the heating unit heating the hot water tank based on a set temperature, before the predetermined period of time does not lapse yet or after the predetermined period of time has lapsed, if the difference between a temperature of water introduced to the hot water tank and a temperature of hot water dispensed from the hot water tank exceeds the preset difference reference, it may be determined that the secondly dispensed water is for a successive cup (repeated cup) and the power output of the heating unit 300 may be controlled continuously.

Also, in step S30 of controlling power output of the heating unit heating the hot water tank based on a set temperature, when it is determined that the secondly dispensed water is for the successive cup (repeated cup) and a temperature of water introduced to the hot water tank 200 is equal to or higher than the preset water temperature reference, a preheat time may be set for the power output of the heating unit based on a temperature of the introduced water and controlled.

When it is determined that the secondly dispensed water is for the first cup or the successive cup (repeated cup), the preheat time may be set as illustrated in FIGS. 6 and 7, for example.

In the step S40 of dispensing hot water stored in the hot water tank, hot water heated by the power output of the heating unit in the step S30 of controlling power output of the heating unit heating the hot water tank based on the set temperature may be dispensed to the outside of the water purifier.

The control method 2 may further include a step S1 of initially installing the water purifier.

In the step S1 of initially installing the water purifier, the water purifier may be installed in an environment in which the water purifier is installed.

FIG. 15 illustrate an example method of controlling a water purifier. As illustrated in FIG. 15, when the control method 2 includes the step S1 of initially installing the water purifier, the control method 2 may further include a step S2 of detecting a flow rate of water introduced to the hot water tank, a step S3 of calculating an angle and an appropriate control value of the flow rate valve on the basis of the detected flow rate of introduced water, and a step S4 of setting an initial angle of the flow rate valve on the basis of the calculated angle and the calculated appropriate control value and adjusting an angle of the flow rate valve.

In the step S2 of detecting a flow rate of water introduced to the hot water tank, a flow rate of water introduced to the hot water tank in an environment in which the water purifier is installed may be detected.

In the step S3 of calculating an angle of the flow rate valve relative to ground and an appropriate control value on the basis of the detected flow rate of introduced water, an angle and an appropriate control value of the flow rate valve may be calculated on the basis of the flow rate of introduced water detected in the step S2 of detecting the flow rate of water introduced to the hot water tank.

The step S4 of setting an initial angle of the flow rate valve on the basis of the calculated angle and the calculated appropriate control value and adjusting an angle of the flow rate valve, an initial angle of the flow rate valve may be set and adjusted on the basis of the angle and the appropriate control value calculated in the step S3 of calculating an angle and an appropriate control value of the flow rate valve on the basis of the detected flow rate of introduced water.

That is, based on the control method 2 further including the above steps, when the water purifier is initially installed, a flow rate of water introduced to the hot water tank in an environment in which the water purifier is installed is detected, an angle and an appropriate control value of the flow rate valve are calculated based on the detected flow rate of introduced water, an initial angle of the flow rate valve is set on the basis of the calculated angle and appropriate control value to allow a flow rate of water to be introduced to the hot water tank based on the set initial angle, and an angle of the flow rate valve is adjusted based on the flow rate of introduced water and an amount of water stored in the hot water tank on the basis of the appropriate control value to allow water to be continuously introduced to the hot water tank, whereby hot water may be controlled to be continuously dispensed from the hot water tank.

What is claimed is:

1. A control device of a water purifier that dispenses hot water, the control device comprising:
    an input unit that receives, from a user, a command signal including information regarding a set temperature; and
    a controller that is configured to control the water purifier based on the command signal,
    wherein the controller is configured to:
        control power output of an induction heater that is configured to, based on the set temperature, heat water stored in a hot water tank of the water purifier to thereby generate hot water to be dispensed,
        control a temperature of the hot water dispensed by the water purifier based on the power output of the induction heater,
        control the power output of the induction heater by controlling a frequency or a phase of AC power supplied to the induction heater,
        control the frequency or the phase of AC power applied to the induction heater based on a difference between a detected temperature of water introduced into the hot water tank and a detected temperature of the hot water dispensed from the hot water tank compared to a preset difference reference, and
        adjust an angle of a flow rate valve that is positioned at an upstream of the hot water tank and that is configured to control a flow channel configured to supply purified water from a filter to the hot water tank.

2. A water purifier comprising:
    an input unit that receives, from a user, a command signal including information regarding a set temperature;
    an inlet part through which purified water is introduced;
    a hot water tank that is configured to store water introduced through the inlet part;
    a flow rate valve positioned at an upstream of the hot water tank and configured to adjust a flow rate of water introduced to the hot water tank, the flow rate valve being configured to control a flow channel that is configured to supply purified water from a filter to the hot water tank;
    an induction heater that is configured to, based on the set temperature, heat water stored in the hot water tank to thereby generate hot water to be dispensed;
    a water dispense part that is configured to dispense the hot water stored in the hot water tank; and
    a control device that is configured to:
        control power output of the induction heater based on the set temperature,
        control a temperature of the hot water dispensed by the water dispense part based on the power output of the induction heater,
        control the power output of the induction heater by controlling a frequency or a phase of AC power supplied to the induction heater,
        control the frequency or the phase of AC power applied to the induction heater based on a difference between a detected temperature of water introduced into the hot water tank and a detected temperature of the hot water dispensed from the hot water tank compared to a preset difference reference, and
        adjust an angle of the flow rate valve.

3. A control method of a water purifier, the control method comprising:
    receiving a command signal including information regarding a set temperature;
    receiving purified water;
    storing the purified water in a hot water tank of the water purifier,
    wherein the water purifier includes a heating unit that is configured to heat water stored in the hot water tank based on the set temperature and that includes an induction heater;
    controlling power output of the heating unit by controlling a frequency or a phase of AC power supplied to the heating unit;
    based on the power output of the heating unit, controlling a temperature of hot water dispensed from the hot water tank;
    dispensing the hot water from the hot water tank;
    controlling the frequency or the phase of AC power applied to the induction heater based on a difference between a detected temperature of water introduced into the hot water tank and a detected temperature of the hot water dispensed from the hot water tank compared to a preset difference reference; and
    adjusting an angle of a flow rate valve positioned at an upstream of the hot water tank.

4. The control device of claim 1, wherein the controller is configured to:
    adjust a flow rate of water introduced to the hot water tank based on the difference between the detected temperature of water introduced into the hot water tank and the detected temperature of the hot water dispensed from the hot water tank.

5. The control device of claim 1, wherein the controller is configured to:
    detect a flow rate of water introduced to the hot water tank;

based on the detected flow rate of water introduced to the hot water tank, calculate the angle of the flow rate valve relative to ground and a control value of the flow rate valve; and control the angle of the flow rate valve based on the detected flow rate of water introduced to the hot water tank or an amount of water stored in the hot water tank.

6. The water purifier of claim 2, wherein the control device is configured to:

detect a flow rate of water introduced to the hot water tank;

based on the detected flow rate of water introduced to the hot water tank, calculate the angle of the flow rate valve relative to ground and a control value of the flow rate valve; and control the angle of the flow rate valve based on the detected flow rate of water introduced to the hot water tank or an amount of water stored in the hot water tank.

7. The control method of claim 3, further comprising:

detecting a flow rate of water introduced to the hot water tank;

based on the detected flow rate of water introduced to the hot water tank, calculating the angle of the flow rate valve relative to ground and a control value of the flow rate valve; and controlling the angle of the flow rate valve based on the detected flow rate of water introduced to the hot water tank or an amount of water stored in the hot water tank.

* * * * *